US011955726B2

(12) United States Patent
Kim et al.

(10) Patent No.: US 11,955,726 B2
(45) Date of Patent: Apr. 9, 2024

(54) ANTENNA DEVICE

(71) Applicant: Samsung Electro-Mechanics Co., Ltd., Suwon-si (KR)

(72) Inventors: Nam Ki Kim, Suwon-si (KR); Wongi Kim, Suwon-si (KR); Kyubum Han, Suwon-si (KR); Hyungho Seo, Suwon-si (KR); Hokyung Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 380 days.

(21) Appl. No.: 17/346,562

(22) Filed: Jun. 14, 2021

(65) Prior Publication Data

US 2022/0285842 A1 Sep. 8, 2022

(30) Foreign Application Priority Data

Mar. 8, 2021 (KR) ........................ 10-2021-0030401

(51) Int. Cl.

*H01Q 9/04* (2006.01)
*H01Q 1/22* (2006.01)
*H01Q 1/48* (2006.01)
*H01Q 5/45* (2015.01)

(52) U.S. Cl.

CPC ............. *H01Q 5/45* (2015.01); *H01Q 1/2283* (2013.01); *H01Q 1/48* (2013.01); *H01Q 9/0414* (2013.01); *H01Q 9/0428* (2013.01)

(58) Field of Classification Search

CPC ..... H01Q 1/2283; H01Q 9/0407–0428; H01Q 1/38–48; H01Q 5/30–45

See application file for complete search history.

(56) References Cited

U.S. PATENT DOCUMENTS

| | | | | |
|---|---|---|---|---|
| 10,833,414 | B2 * | 11/2020 | Kim | H01Q 9/0464 |
| 10,931,014 | B2 * | 2/2021 | Tehran | H01Q 21/065 |
| 2004/0140933 | A1 | 7/2004 | Shikata et al. | |
| 2012/0127038 | A1 | 5/2012 | Kim et al. | |
| 2020/0136269 | A1 | 4/2020 | Choi et al. | |
| 2020/0328518 | A1 * | 10/2020 | Park | H01Q 9/0414 |

FOREIGN PATENT DOCUMENTS

| | | | |
|---|---|---|---|
| JP | 2004-228692 | A | 8/2004 |
| KR | 10-1139703 | B1 | 4/2012 |
| KR | 10-2020-0046482 | A | 5/2020 |

* cited by examiner

*Primary Examiner* — Hasan Islam

(74) *Attorney, Agent, or Firm* — NSIP Law

(57) ABSTRACT

An antenna device includes a dielectric layer disposed on a ground plane; a first patch antenna pattern disposed on the dielectric layer; first and second feed vias feeding an RF signal to the first patch antenna pattern; a first feed pattern connected to the first feed via, and coupled to the first patch antenna pattern; and a second feed pattern connected to the second feed via and coupled to the first patch antenna pattern. The first patch antenna pattern includes a first edge in parallel with a first direction, and a second edge in parallel with a second direction. The first feed pattern is disposed near the second edge, the second feed pattern is disposed near the first edge, and a first width of the first feed pattern measured in a second direction is different from a second width of the second feed pattern measured in the first direction.

13 Claims, 20 Drawing Sheets

ANTENNA DEVICE

CROSS-REFERENCE TO RELATED APPLICATION(S)

This application claims the benefit under 35 USC § 119(a) of Korean Patent Application No. 10-2021-0030401, filed on Mar. 8, 2021, in the Korean Intellectual Property Office, the entire disclosure of which is incorporated herein by reference for all purposes.

BACKGROUND

1. Field

The following description relates to an antenna device.

2. Description of Related Art

Recently, millimeter wave (mmWave) communication including 5-generation (5G) communication has been implemented. In the example of the 5-generation (5G) communication, a multi-bandwidth antenna that transmits and receives radio frequency (RF) signals with various bandwidths with one antenna is being implemented.

Additionally, as portable electronic devices are developed, the size of a display screen of the electronic device has increased, the size of a bezel that is a non-display area in which an antenna is disposed is reduced, and an area of the region in which the antenna may be installed is also reduced.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an antenna device includes a ground plane; a dielectric layer, disposed on the ground plane; a first patch antenna pattern, disposed on the dielectric layer; a first feed via and a second feed via configured to feed a first radio frequency (RF) signal to the first patch antenna pattern; a first feed pattern, connected to the first feed via, and coupled to the first patch antenna pattern; and a second feed pattern, connected to the second feed via, and coupled to the first patch antenna pattern, wherein the first patch antenna pattern includes a first edge in parallel with a first direction and a second edge in parallel with a second direction that is different from the first direction, the first feed pattern is disposed closer to the second edge of the first patch antenna than to the first edge of the first patch antenna in a plan view, the second feed pattern is disposed closer to the first edge of the first patch antenna than the second edge of the first patch antenna in a plan view, and a first width of the first feed pattern measured in the second direction is different from a second width of the second feed pattern measured in the first direction.

A height of the first feed pattern is substantially equal to a height of the second feed pattern measured from the ground plane in a third direction that is perpendicular to the first direction and the second direction, and the first width of the first feed pattern is greater than the second width of the second feed pattern.

The antenna device may further include a first inductive line connected to the first patch antenna pattern and coupled to the first feed pattern; and a second inductive line connected to the first patch antenna pattern and coupled to the second feed pattern, wherein the second inductive line has a length that is greater than a length of the first inductive line.

The first inductive line may be configured to have a straight-line form, and the second inductive line includes a protrusion configured to protrude toward a center of the first patch antenna pattern.

The antenna device may further include a second patch antenna pattern disposed on the dielectric layer; a third feed via and a fourth feed via configured to feed a second RF signal to the second patch antenna pattern; and a decoupled pattern disposed between the first feed via and the third feed via, and between the second feed via and the fourth feed via in a plan view, wherein a frequency of the first RF signal is different from a frequency of the second RF signal.

The decoupled pattern may be connected to the second inductive line.

The first patch antenna pattern may include a plurality of concave portions formed on at least one edge of the first patch antenna pattern, and at least a portion of the first inductive line and the second inductive line overlap the concave portions in a top-to-bottom direction.

The antenna device may further include a plurality of second antenna patterns spaced from the first patch antenna pattern and, disposed at areas corresponding to the concave portions, wherein at least portions of the plurality of second antenna patterns are disposed in the concave portions.

In a general aspect, an antenna device includes a ground plane; a dielectric layer, disposed on the ground plane; a first patch antenna pattern, disposed on the dielectric layer; a first feed via and second feed via configured to feed a first radio frequency (RF) signal to the first patch antenna pattern; a first inductive line, connected to the first patch antenna pattern, and coupled to the first feed via; and a second inductive line, connected to the first patch antenna pattern, and coupled to the second feed via, wherein a length of the first inductive line is different from a length of the second inductive line.

A gap between the first feed via and the first patch antenna pattern may be greater than a gap between the second feed via and the first patch antenna pattern in a plan view, and wherein a length of the second inductive line is greater than a length of the first inductive line.

The first inductive line may have a straight-line shape, and the second inductive line may include a protrusion portion that protrudes toward a center of the first patch antenna pattern.

The first patch antenna pattern may include a concave portion formed on at least one edge of the first patch antenna pattern, and at least a portion of the first inductive line and the second inductive line may overlap the concave portion in a top-to-bottom direction.

In a general aspect, an antenna device includes a ground plane; a dielectric layer, disposed on the ground plane; a first patch antenna pattern and a second patch antenna pattern disposed on the dielectric layer; a first feed via configured to feed a first radio frequency (RF) signal to the first patch antenna pattern; a second feed via configured to feed a second RF signal to the second patch antenna pattern; an inductive line connected to the first patch antenna pattern and coupled to the first feed via; and a decoupled pattern connected to the inductive line and disposed between the first feed via and the second feed via in a plan view.

The decoupled pattern may overlap the first patch antenna pattern and the second patch antenna pattern in a top-to-bottom direction.

The first patch antenna pattern may include a concave portion formed in at least one edge of the first patch antenna pattern, and at least a portion of the inductive line overlaps the concave portion in a top-to-bottom direction.

The antenna may further include a second antenna pattern spaced from the first patch antenna pattern, and disposed on an area corresponding to the concave portion, and wherein at least a portion of the second antenna pattern is disposed in the concave portion.

The decoupled pattern may surround the second feed via.

In a general aspect, an electronic device includes a communication modem; and an antenna device, connected to the communication modem, wherein the antenna device includes: a first feed pattern, coupled to a first feed via; a second feed pattern, coupled to a second feed via; a third feed pattern, coupled to a third feed via; a fourth feed pattern, coupled to a fourth feed via; a first patch antenna pattern, coupled to the first feed pattern to transmit and/or receive a first radio frequency (RF) signal with a first polarization, and coupled to the second feed pattern to transmit and/or receive the first RF signal with a second polarization; a second patch antenna pattern, coupled to the third feed pattern to transmit and/or receive a second RF signal with a first polarization, and coupled to the fourth feed pattern to transmit and/or receive the second RF signal with a second polarization, and a decoupled ring pattern, disposed between the first feed via and the third feed via, and between the second feed via and the fourth feed via.

A width of the first feed pattern measured in a second direction may be different from a width of the second feed pattern measured in a first direction, and a width of the first feed pattern measured in a direction parallel to the first direction may be equal to a width of the second feed pattern measured in a direction parallel to the second direction.

A frequency of the first RF signal may be different from a frequency of the second RF signal.

Other features and aspects will be apparent from the following detailed description, the drawings, and the claims.

Figure 1:
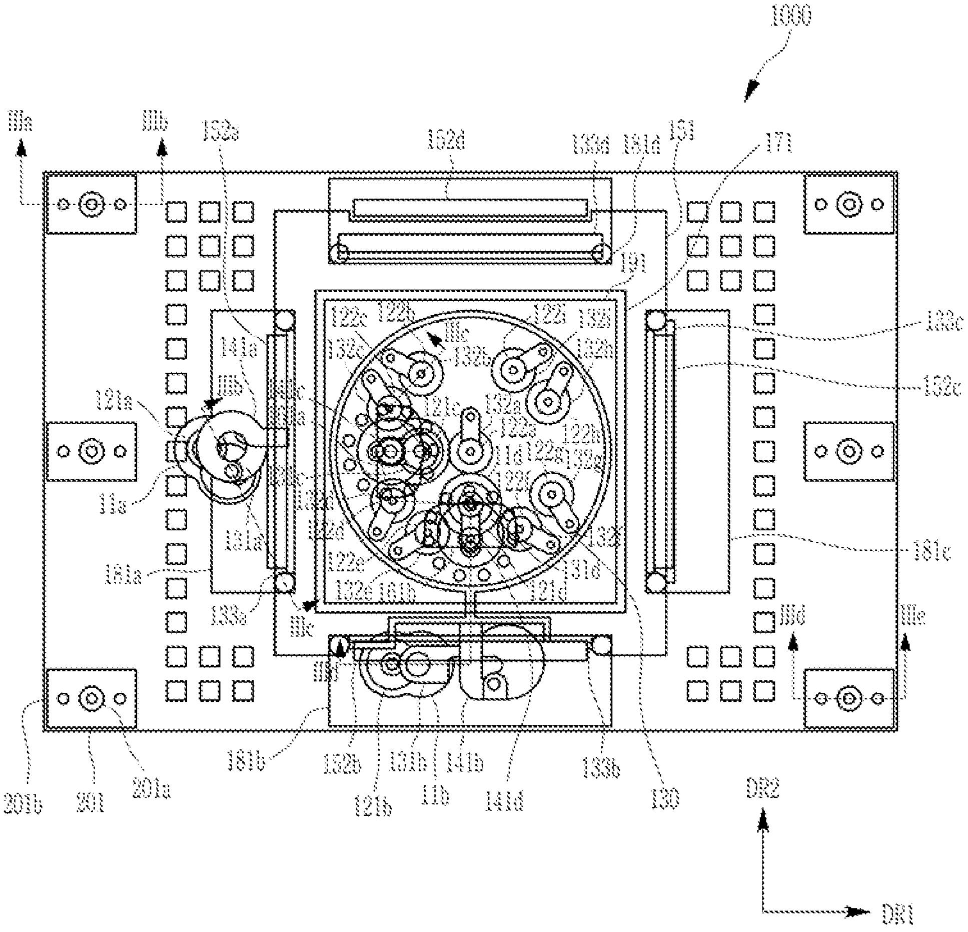
FIG. 1 illustrates a top plan view of an example antenna device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The size and thickness of each configuration shown in the drawings are arbitrarily shown for better understanding and ease of description, but the embodiments are not limited thereto. In the drawings, the thickness of layers, films, panels, regions, etc., are exaggerated for clarity. The thicknesses of some layers and areas are exaggerated for convenience of explanation.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The phrase "in a plan view" means viewing an object portion from the top, and the phrase "in a cross-sectional view" means viewing a cross-section of which the object portion is vertically cut from the side.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Patterns, vias, planes, lines, and electrical connection structures may include, as non-limited examples, metal materials (e.g., conductive materials such as copper (Cu), aluminum (Al), silver (Ag), tin (Sn), gold (Au), nickel (Ni), lead (Pb), titanium (Ti), or their alloys), and they may be formed according to plating methods such as chemical vapor deposition (CVD), physical vapor deposition (PVD), sputtering, a subtractive, additive, or semi-additive process (SAP), or a modified semi-additive process (MSAP), and they are not limited thereto.

A dielectric layer and/or an insulation layer may be realized with a thermosetting resin such as FR4, a liquid crystal polymer (LCP), a low temperature co-fired ceramic (LTCC), or an epoxy resin, a thermoplastic resin such as a polyimide, a resin generated by impregnating the above-noted resin together with an inorganic filler into a core material such as a glass fiber (or glass cloth or glass fabric), a prepreg, an Ajinomoto Build-up Film (ABF), FR-4, Bismaleimide Triazine (BT), a photoimageable dielectric (PID) resin, a copper clad laminate (CCL), glass, or a ceramic-based insulator.

The radio frequency (RF) signal may have a format according to other random wireless and wired protocols designated by Wi-Fi (IEEE 802.11 family, etc.), WiMAX (IEEE 802.16 family, etc.), IEEE 802.20, LTE (long term evolution), Ev-DO, HSPA+, HSDPA+, HSUPA+, EDGE, GSM, GPS, GPRS, CDMA, TDMA, DECT, Bluetooth, 3G, 4G, 5G, and subsequent ones.

An example antenna device, in accordance with one or more embodiments, will now be described with reference to FIG. 1 to FIG. 3, and FIG. 4 to FIG. 11.

Figure 2:
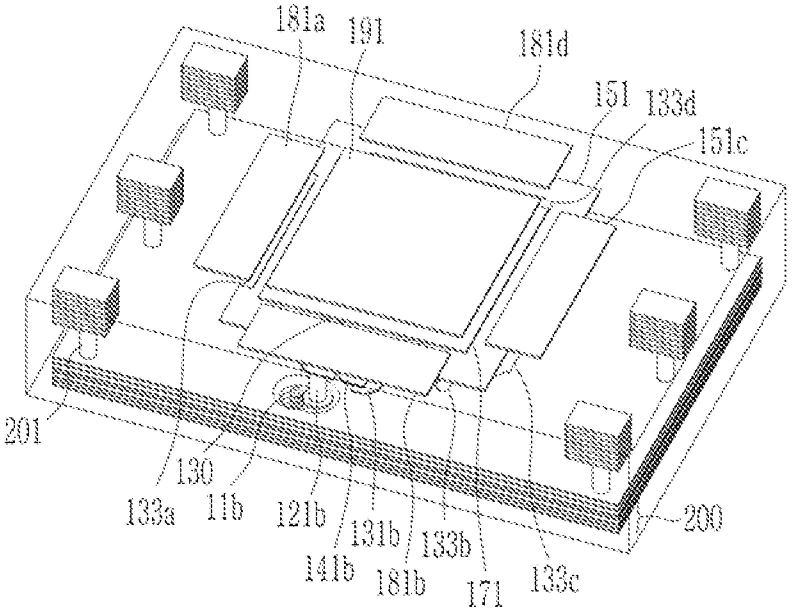
FIG. 2 illustrates a perspective view of an example antenna device, in accordance with one or more embodiments.
Figure 3:
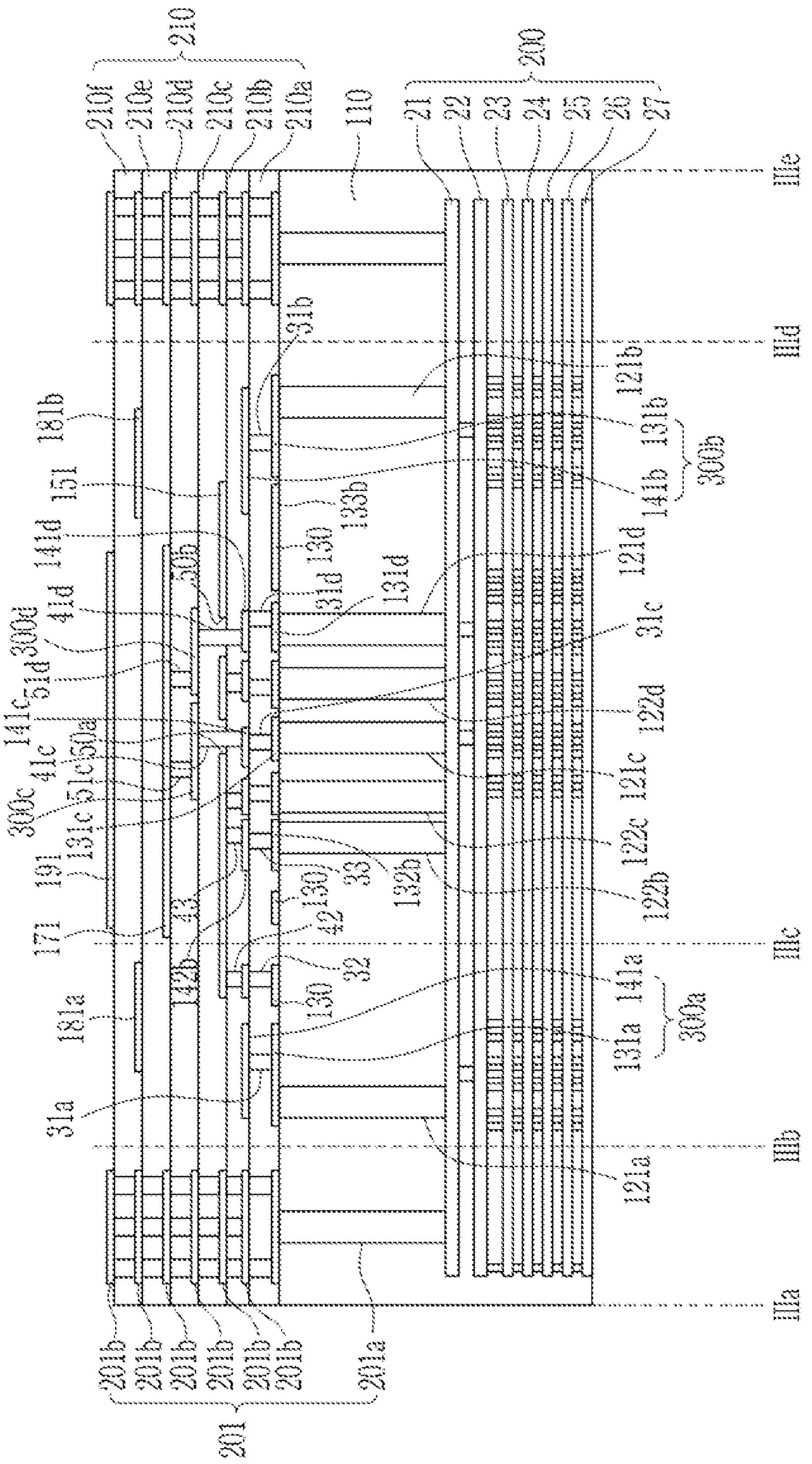
FIG. 3 illustrates a cross-sectional view of an example antenna device of FIG. 1 with respect to a line IIIa-IIIb-IIIc-IIId-IIIe.

FIG. 1 illustrates a top plan view of an example antenna device, in accordance with one or more embodiments, FIG. 2 illustrates a perspective view of an example antenna device, in accordance with one or more embodiments, and FIG. 3 illustrates a cross-sectional view of an example antenna device of FIG. 1 with respect to a line IIIa-IIIb-IIIc-IIId-IIIe. FIG. 4 to FIG. 11 illustrate top plan views of part of an example antenna device, in accordance with one or more embodiments.

Referring to FIG. 1 to FIG. 3, the example antenna device 1000, in accordance with one or more embodiments, includes a first feed via 121*a*, a second feed via 121*b*, a third feed via 121*c*, a fourth feed via 121*d*, a plurality of shielding vias 122*a*, 122*b*, 122*c*, 122*d*, 122*e*, 122*f*, 122*g*, 122*h*, and 122*i*, a plurality of shielding structures 201, a plurality of feed patterns 300*a*, 300*b*, 300*c*, and 330*d*, a decoupled pattern or decoupled ring pattern 130, a plurality of inductive lines 133*a*, 133*b*, 133*c*, and 133*d*, a first patch antenna pattern 151, a plurality of first additional antenna patterns 152*a*, 152*b*, 152*c*, and 152*d*, a second patch antenna pattern 171, a plurality of second additional antenna patterns 181*a*, 181*b*, 181*c*, and 181*d*, and a third patch antenna pattern 191.

The antenna device 1000 may further include a first dielectric layer 110 generated by expanding a plane formed when a first direction (DR1) crosses a second direction (DR2) in a third direction (DR3) that is orthogonal to the first direction (DR1) and the second direction (DR2), a second dielectric layer 210 disposed on the first dielectric layer 110 in the third direction (DR3), and a connecting member 200 disposed below the first dielectric layer 110 in the third direction (DR3).

In an example, the second dielectric layer 210 may include a plurality of layers 210*a*, 210*b*, 210*c*, 210*d*, 210*e*, and 210*f*, and for example, it may include a first layer 210*a*, a second layer 210*b*, a third layer 210*c*, a fourth layer 210*d*, a fifth layer 210*e*, and a sixth layer 210*f* sequentially disposed in the third direction (DR3).

The first dielectric layer 110 may have a dielectric constant of 3.55, a loss tangent of 0.004, and a thickness of 400 μm, but it is not limited thereto. The second dielectric layer 210 may include a plurality of layers made of a prepreg dielectric material with the dielectric constant of 3.55 and the loss tangent of 0.004.

The connecting member 200 may include a ground plane 21 and a plurality of layers 22, 23, 24, 25, 26, and 27.

The first feed via 121*a*, the second feed via 121*b*, the third feed via 121*c*, the fourth feed via 121*d*, and the plurality of shielding vias 122*a*, 122*b*, 122*c*, 122*d*, 122*e*, 122*f*, 122*g*, 122*h*, and 122*i* may penetrate the first dielectric layer 110.

The first feed via 121*a*, the second feed via 121*b*, the third feed via 121*c*, and the fourth feed via 121*d* may penetrate the ground plane 21 through a first hole 11*a*, a second hole 11*b*, a third hole 11*c*, and a fourth hole 11*d* formed in the ground plane 21, and may be connected to the plurality of layers 22, 23, 24, 25, 26, and 27 of the connecting member 200.

The plurality of shielding structures 201, the plurality of feed patterns 300*a*, 300*b*, 300*c*, and 330*d*, the decoupled pattern 130, the plurality of inductive lines 133*a*, 133*b*, 133*c*, and 133*d*, the first patch antenna pattern 151, the plurality of first additional antenna patterns 152*a*, 152*b*, 152*c*, and 152*d*, the plurality of second additional antenna patterns 181*a*, 181*b*, 181*c*, and 181*d*, the second patch antenna pattern 171, and the third patch antenna pattern 191 may be disposed among the plurality of layers 210*a*, 210*b*, 210*c*, 210*d*, 210*e*, 210*f*, and 210*g* of the second dielectric layer 210.

The plurality of inductive lines 133*a*, 133*b*, 133*c*, and 133*d* may include a first inductive line 133*a* disposed near the first feed via 121*a*, a second inductive line 133*b* disposed near the second feed via 121*b*, a third inductive line 133*c* disposed to face the first inductive line 133*a* in the first direction (DR1), and a fourth inductive line 133*d* disposed to face the second inductive line 133*b* in the second direction (DR2).

The decoupled pattern 130 may be disposed between the first feed via 121*a* and the third feed via 121*c* and between the second feed via 121*b* and the fourth feed via 121*d*. The decoupled pattern 130 may be connected to the second inductive line 133*b*.

The plurality of feed patterns 300*a*, 300*b*, 300*c*, and 330*d* include a first feed pattern 300*a* connected to the first feed via 121*a*, a second feed pattern 300*b* connected to the second feed via 121*b*, a third feed pattern 300*c* connected to the third feed via 121*c*, and a fourth feed pattern 300*d* connected to the fourth feed via 121*d*.

The first feed pattern 300*a* connected to the first feed via 121*a* may include a first pattern 131*a* disposed on the first dielectric layer 110, and a second pattern 141*a* disposed on the first layer 210*a* of the second dielectric layer 210, and the first pattern 131*a* and the second pattern 141*a* of the first feed pattern 300*a* may be connected to each other through a connecting via 31*a* to form a first winding feed pattern in a winding shape.

The second feed pattern 300*b* connected to the second feed via 121*b* may include a first pattern 131*b* disposed on the first dielectric layer 110 and a second pattern 141*b* disposed on the first layer 210*a* of the second dielectric layer 210, and the first pattern 131*b* and the second pattern 141*b* of the second feed pattern 300*b* may be connected to each other through the connecting via 31*b* to form a second winding feed pattern in a winding shape.

The first feed pattern 300*a* connected to the first feed via 121*a* may be disposed near an edge that is substantially parallel to the first direction (DR1) from among edges of the first patch antenna pattern 151, and the first feed pattern 300*a* connected to the first feed via 121*a* may overlap at least a portion of the edge that is substantially parallel to the first direction (DR1) from among the edges of the first patch antenna pattern 151 in the third direction (DR3) that are perpendicular to the first direction (DR1) and the second direction (DR2).

The second feed pattern 300*b* connected to the second feed via 121*b* may be disposed near the edge that is substantially parallel to the second direction (DR2) from among the edges of the first patch antenna pattern 151.

Shapes and sizes of the first pattern 131*a* and the second pattern 141*a* of the first feed pattern 300*a* connected to the first feed via 121*a* may be different from shapes and sizes of the first pattern 131*b* and the second pattern 141*b* of the second feed pattern 300*b* connected to the second feed via 121*b*. For example, a width of the first feed pattern 300*a* measured in a direction parallel to the second direction (DR2) may be different from a width of the second feed pattern 300*b* measured in a direction parallel to the first direction (DR1), and a width of the first feed pattern 300*a* measured in a direction parallel to the first direction (DR1) may be substantially equal to a width of the second feed pattern 300*b* measured in a direction parallel to the second direction (DR2).

A height of the first feed pattern 300*a* and a height of the second feed pattern 300*b* measured from the ground plane 21 in the third direction (DR3) that is orthogonal to the first direction (DR1) and the second direction (DR2) may be substantially equal to each other.

The third feed pattern 300*c* connected to the third feed via 121*c* may be disposed on the third layer 210*c* of the second dielectric layer 210. The third feed pattern 300*c* may be connected to a third feed via 121*c* through a first connecting pattern 131*c* disposed on the first dielectric layer 110, a second connecting pattern 141*c* disposed on a first layer 210*a* of the second dielectric layer 210, and connecting vias 31*c* and 41*c*, and the third feed pattern 300*c* may be connected to the second patch antenna pattern 171 through a connecting via 51*c*.

The fourth feed pattern 300*d* connected to the fourth feed via 121*d* may be disposed on the third layer 210*c* of the second dielectric layer 210. The fourth feed pattern 300*d* may be connected to the fourth feed via 121*d* through a first connecting pattern 131*d* disposed on the first dielectric layer 110, a second connecting pattern 141*d* disposed on the first layer 210*a* of the second dielectric layer 210, and connecting vias 31*d* and 41*d*, and the fourth feed pattern 300*d* may be connected to the second patch antenna pattern 171 through a connecting via 51*d*.

The first feed pattern 300*a* connected to the first feed via 121*a* and the second feed pattern 300*b* connected to the second feed via 121*b* are coupled to the first patch antenna pattern 151 and the plurality of first additional antenna patterns 152*a*, 152*b*, 152*c*, and 152*d*, and may transmit electrical signals to the first patch antenna pattern 151 and the plurality of first additional antenna patterns 152*a*, 152*b*, 152*c*, and 152*d*.

The first feed pattern 300*a* and the second feed pattern 300*b* may not be directly connected to the first patch antenna pattern 151 and the plurality of first additional antenna patterns 152*a*, 152*b*, 152*c*, and 152*d* but may overlap the same.

The third feed pattern 300*c* connected to the third feed via 121*c* and the fourth feed pattern 300*d* connected to the fourth feed via 121*d* may be coupled to the second patch antenna pattern 171, and may transmit electrical signals to the second patch antenna pattern 171.

The first patch antenna pattern 151 and the plurality of first additional antenna patterns 152*a*, 152*b*, 152*c*, and 152*d* may transmit and receive a first RF signal. In an example, the first patch antenna pattern 151 may be a driven patch that transmits and receives the first RF signal, and the plurality of first additional antenna patterns 152*a*, 152*b*, 152*c*, and 152*d* may be parasitic patches that transmit and receive the first RF signal. However, they are not limited thereto.

The second patch antenna pattern 171, the plurality of second additional antenna patterns 181*a*, 181*b*, 181*c*, and 181*d*, and the third patch antenna pattern 191 may transmit and receive a second RF signal. For example, the second patch antenna pattern 171 may be a driven patch for transmitting and receiving the second RF signal, the plurality of second additional antenna patterns 181*a*, 181*b*, 181*c*, and 181*d* may be parasitic patches that transmit and receive the second RF signal, and the third patch antenna pattern 191 may be a director that transmits and receives the second RF signal. However, they are not limited thereto.

In a plan view, a gap between the first feed via 121*a* and the first patch antenna pattern 151 may be greater than a gap between the second feed via 121*b* and the first patch antenna pattern 151.

The plurality of inductive lines 133*a*, 133*b*, 133*c*, and 133*d* may be connected to the first patch antenna pattern 151 through connecting vias 32 that penetrate the first layer 210*a* of the second dielectric layer 210 and connecting vias 42 that penetrate the second layer 210*b* of the second dielectric layer 210 to thus provide a detour of a surface current flowing to the first patch antenna pattern 151, and provide inductance usable for impedance matching of a feeding path on the first patch antenna pattern 151 to the first patch antenna pattern 151.

The plurality of shielding vias 122a, 122b, 122c, 122d, 122e, 122f, 122g, 122h, and 122i may be connected to the ground plane 21.

The plurality of shielding vias 122a, 122b, 122c, 122d, 122e, 122f, 122g, 122h, and 122i may be connected to the first patch antenna pattern 151 through a plurality of first connectors 132a, 132b, 132c, 132d, 132e, 132f, 132g, 132h, and 132i, a plurality of second connectors 142a, 142b, 142c, 142d, 142e, 142f, 142g, 142h, and 142i, a plurality of first connecting vias 33, and a plurality of second connecting vias 43.

The plurality of shielding vias 122a, 122b, 122c, 122d, 122e, 122f, 122g, 122h, and 122i may connect the ground plane 21 and the first patch antenna pattern 151 to shield the third feed via 121c and the fourth feed via 121d from the signal transmitted and/or received to the first patch antenna pattern 151.

The plurality of shielding structures 201 may be disposed around the antenna device 1000, may include a plurality of vias 201a and a plurality of patterns 201b connected to the vias 201a, and may be electrically connected to the ground plane 21. Accordingly, the plurality of shielding structures 201 may prevent interference among the antenna devices that are closely disposed to each other, and a gain of the antenna device 1000 may be increased.

A structure of the antenna device 1000 will now be described in detail.

Figure 4:
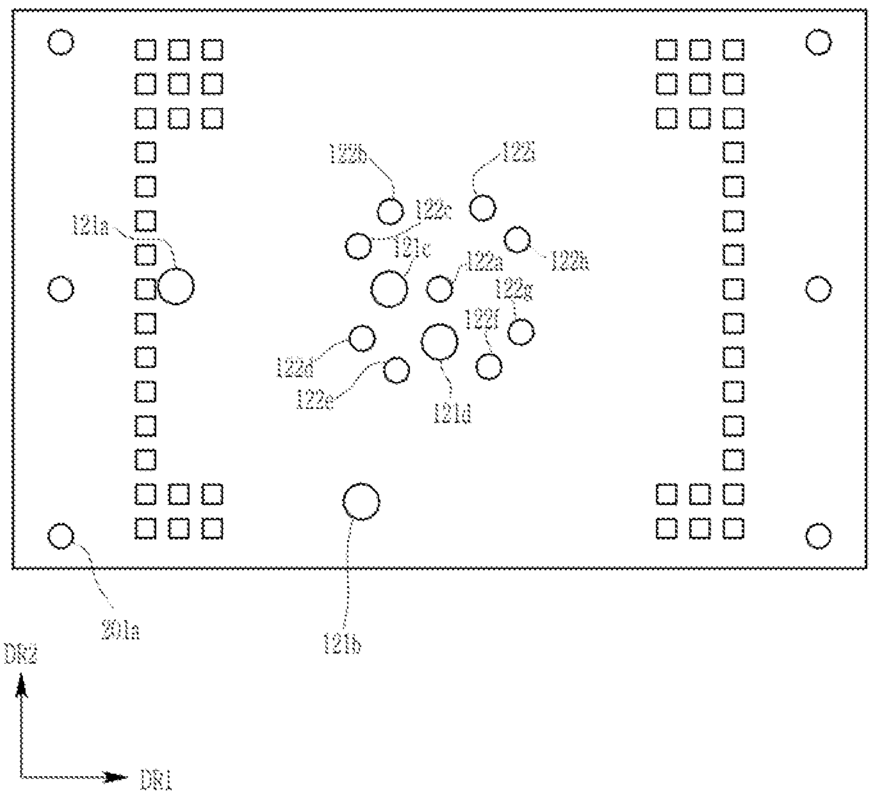
FIG. 4 to FIG. 11 illustrate top plan views of part of an example antenna device, in accordance with one or more embodiments.

Referring to FIG. 4 in conjunction with FIG. 1 to FIG. 3, the first feed via 121a, the second feed via 121b, the third feed via 121c, the fourth feed via 121d, the plurality of shielding vias 122a, 122b, 122c, 122d, 122e, 122f, 122g, 122h, and 122i, and the vias 201a of the plurality of shielding structures 201 may penetrate the first dielectric layer 110.

In an example, the third feed via 121c and the fourth feed via 121d may be closer to a center of the antenna than the first feed via 121a and the second feed via 121b are.

The plurality of shielding vias 122a, 122b, 122c, 122d, 122e, 122f, 122g, 122h, and 122i may be disposed near the third feed via 121c and the fourth feed via 121d.

From among the plurality of shielding vias 122a, 122b, 122c, 122d, 122e, 122f, 122g, 122h, and 122i, the first shielding via 122a may be disposed in the center of the antenna, and the second shielding via 122b and the third shielding via 122c, the fourth shielding via 122d and the fifth shielding via 122e, the sixth shielding via 122f and the seventh shielding via 122g, and the eighth shielding via 122h and the ninth shielding via 122i may be implemented in pairs, and may be disposed to surround the first shielding via 122a, and may be disposed to be symmetric from top to bottom and from right to left with respect to the first shielding via 122a in a plan view.

The plurality of shielding vias 122a, 122b, 122c, 122d, 122e, 122f, 122g, 122h, and 122i may be connected to the ground plane 21. The plurality of shielding vias 122a, 122b, 122c, 122d, 122e, 122f, 122g, 122h, and 122i may be connected to the first patch antenna pattern 151, and thereby the third feed via 121c and the fourth feed via 121d may be shielded from the signal transmitted and/or received to or from the first patch antenna pattern 151 by connecting the ground plane 21 and the first patch antenna pattern 151 through the plurality of shielding vias 122a, 122b, 122c, 122d, 122e, 122f, 122g, 122h, and 122i.

The connecting via 51c and the connecting via 51d connected to the third feed via 121c and the fourth feed via 121d penetrate the first patch antenna pattern 151 and are connected to the second patch antenna pattern 171 disposed on the first patch antenna pattern 151, and the plurality of shielding vias 122a, 122b, 122c, 122d, 122e, 122f, 122g, 122h, and 122i reduce the influence caused by radiation of the first RF signal concentrated on the first patch antenna pattern 151 to reduce the influence between the first patch antenna pattern 151 and the second patch antenna pattern 171, and hence, degradation of the antenna gain caused by interference between the first patch antenna pattern 151 and the second patch antenna pattern 171 may be reduced.

The nine shielding vias 122a, 122b, 122c, 122d, 122e, 122f, 122g, 122h, and 122i have been exemplified according to the embodiment, and without being limited thereto, the number and the width of the shielding vias are not specifically limited. When the gap of the shielding vias is shorter than a specific length, for example, a length that depends on a first wavelength of the first RF signal or a length that depends on a second wavelength of a second RF signal, the first RF signal or the second RF signal may fail to substantially pass through a space among shielding vias, and electromagnetic isolation between the first RF signal and the second RF signal may be further improved.

Figure 5:
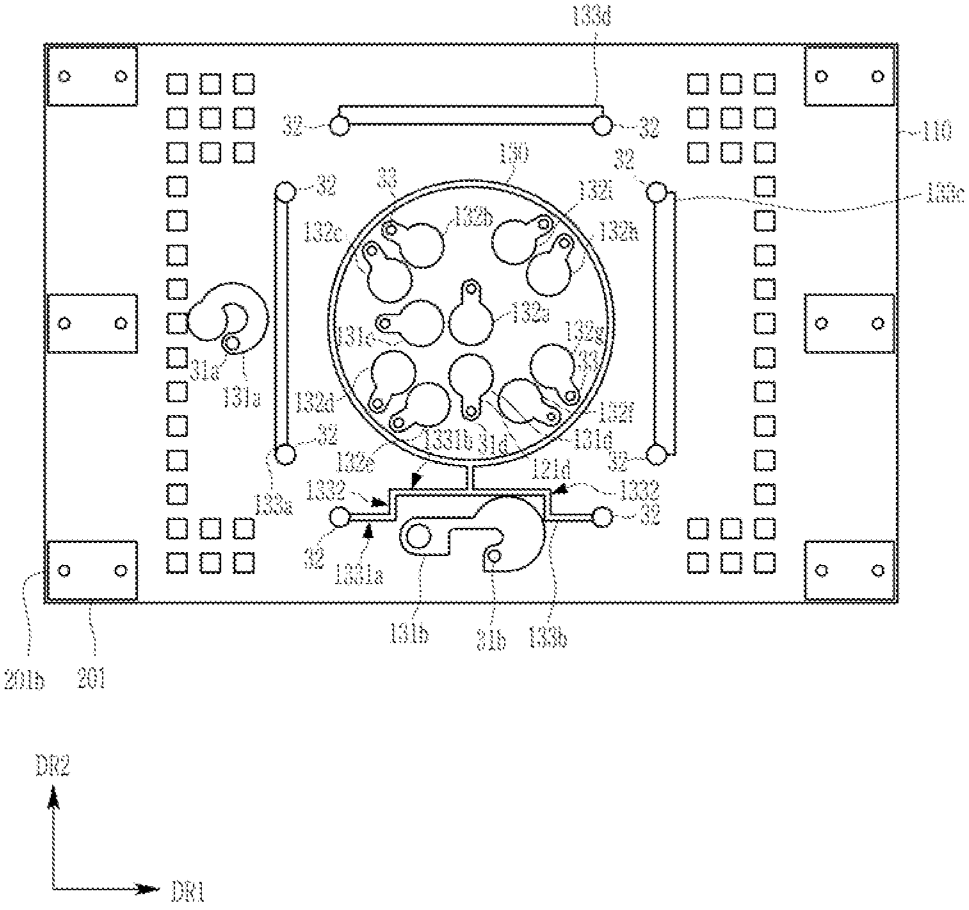

Referring to FIG. 5, in conjunction with FIG. 1 to FIG. 4, the first pattern 131a of the first feed pattern 300a connected to the first feed via 121a, the first pattern 131b of the second feed pattern 300b connected to the second feed via 121b, the first connecting pattern 131c of the third feed pattern 300c connected to the third feed via 121c, the first connecting pattern 131d of the fourth feed pattern 300d connected to the fourth feed via 121d, the plurality of inductive lines 133a, 133b, 133c, and 133d, the decoupled pattern 130, and the plurality of first connectors 132a, 132b, 132c, 132d, 132e, 132f, 132g, 132h, and 132i of the plurality of shielding vias 122a, 122b, 122c, 122d, 122e, 122f, 122g, 122h, and 122i may be disposed on the first dielectric layer 110.

The first pattern 131a of the first feed pattern 300a may be twisted in one direction, and the first pattern 131b of the second feed pattern 300b may include a linear portion 1311 that extends in the first direction (DR1) and a rotation portion 1312 connected to the linear portion 1311 and twisted in one direction. As described, the first pattern 131a of the first feed pattern 300a and the first pattern 131b of the second feed pattern 300b may have different shapes and sizes.

In a plan view, a gap between the first feed via 121a and the first patch antenna pattern 151 may be greater than a gap between the second feed via 121b and the first patch antenna pattern 151, and a size of the second feed pattern 300b may be greater than a size of the first feed pattern 300a.

The plurality of inductive lines 133a, 133b, 133c, and 133d include a first inductive line 133a disposed near the first feed via 121a, a second inductive line 133b disposed near the second feed via 121b, a third inductive line 133c disposed to face the first inductive line 133a in the first direction (DR1), and a fourth inductive line 133d disposed to face the second inductive line 133b in the second direction (DR2).

The second inductive line 133b, disposed near the second feed via 121b, may include a first horizontal unit 1331a and a second horizontal unit 1331b extending in parallel to the first direction (DR1) and a vertical unit 1332 extending in parallel to the second direction (DR2), disposed between the respective horizontal units 1331a and 1331b, and connecting the respective horizontal units 1331a and 1331b. The vertical unit 1332 and the second horizontal unit 1331b of the second inductive line 133b may protrude to the center of the antenna from the first horizontal unit 1331a. As described, as the second inductive line 133b includes protrusions 1332 and 1331*b* protruding toward the antenna center, the second inductive line 133*b* may be longer than the first inductive line 133*a*, the third inductive line 133*c*, and the fourth inductive line 133*d* having a planar shape in a straight-line form extending in the first direction (DR1) or the second direction (DR2).

As described above, the plurality of inductive lines 133*a*, 133*b*, 133*c*, and 133*d* are connected to the first patch antenna pattern 151 to provide a detour of a surface current flowing to the first patch antenna pattern 151, and the second inductive line 133*b* is formed to be longer than the first inductive line 133*a*, the third inductive line 133*c*, and the fourth inductive line 133*d*, so the detour of the surface current caused by the second inductive line 133*b* disposed near the second feed via 121*b* may become relatively long.

Further, the second inductive line 133*b* includes protrusions 1332 and 1331*b* protruding toward the antenna center from the first horizontal unit 1331*a*, so a space for disposing the second feed pattern 300*b* connected to the second feed via 121*b* may be provided.

The decoupled pattern 130 may be connected to the second inductive line 133*b*, and the decoupled pattern 130 may be disposed between the first feed via 121*a* and the third feed via 121*c* and between the second feed via 121*b* and the fourth feed via 121*d*. The decoupled pattern 130 prevents coupling between the first feed via 121*a* and the third feed via 121*c* disposed near each other and coupling between the second feed via 121*b* and the fourth feed via 121*d* disposed near each other. Therefore, isolation between the first feed via 121*a* and the third feed via 121*c* of which the gap reduces as the antenna device 1000 becomes smaller may be increased. Particularly, as the width of the antenna device 1000 in the second direction (DR2) is reduced, the isolation between the second feed via 121*b* and the fourth feed via 121*d* of which the gap therebetween is further reduced may be increased. Further, the decoupled pattern 130 may additionally provide a detour of the surface current caused by the second inductive line 133*b*.

Figure 6:
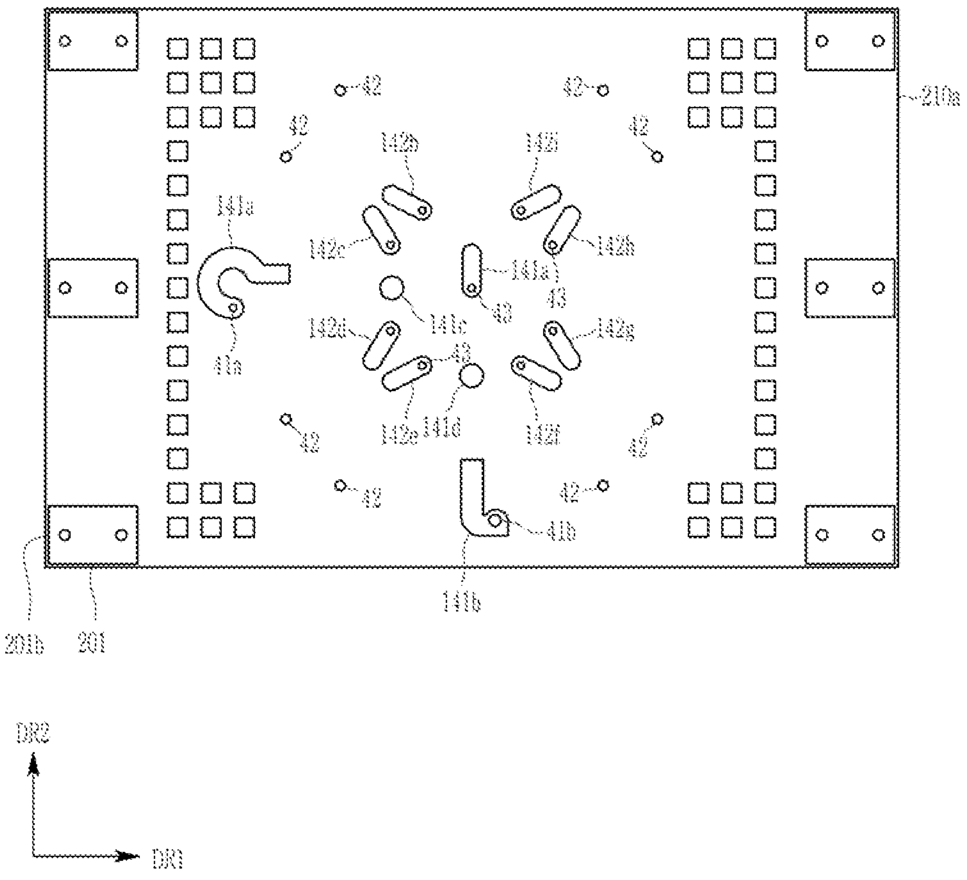

Referring to FIG. 6 in conjunction with FIG. 1 to FIG. 5, the second pattern 141*a* of the first feed pattern 300*a* connected to the first feed via 121*a*, the second pattern 141*b* of the second feed pattern 300*b* connected to the second feed via 121*b*, the second connecting pattern 141*c* of the third feed pattern 300*c* connected to the third feed via 121*c*, the second connecting pattern 141*d* of the fourth feed pattern 300*d* connected to the fourth feed via 121*d*, and the plurality of second connectors 142*a*, 142*b*, 142*c*, 142*d*, 142*e*, 142*f*, 142*g*, 142*h*, and 142*i* of the plurality of shielding vias 122*a*, 122*b*, 122*c*, 122*d*, 122*e*, 122*f*, 122*g*, 122*h*, and 122*i* may be disposed on the first layer 210*a* of the second dielectric layer 210.

The first pattern 131*a* and the second pattern 141*a* of the first feed pattern 300*a* may be connected to each other through the connecting via 31*a* to configure a first winding feed pattern in a winding shape, and the first pattern 131*b* and the second pattern 141*b* of the second feed pattern 300*b* may be connected to each other through the connecting via 31*b* to configure a second winding feed pattern in a winding shape.

The first connecting pattern 131*c* and the second connecting pattern 141*c* of the third feed pattern 300*c* are connected to each other through the connecting via 31*c*, and the first connecting pattern 131*d* and the second connecting pattern 141*d* of the fourth feed pattern 300*d* are connected to each other through the connecting via 31*d*.

The plurality of first connectors 132*a*, 132*b*, 132*c*, 132*d*, 132*e*, 132*f*, 132*g*, 132*h*, and 132*i* and the plurality of second connectors 142*a*, 142*b*, 142*c*, 142*d*, 142*e*, 142*f*, 142*g*, 142*h*, and 142*i* of the plurality of shielding vias 122*a*, 122*b*, 122*c*, 122*d*, 122*e*, 122*f*, 122*g*, 122*h*, and 122*i* may be connected to each other through the plurality of first connecting vias 33.

Figure 7:
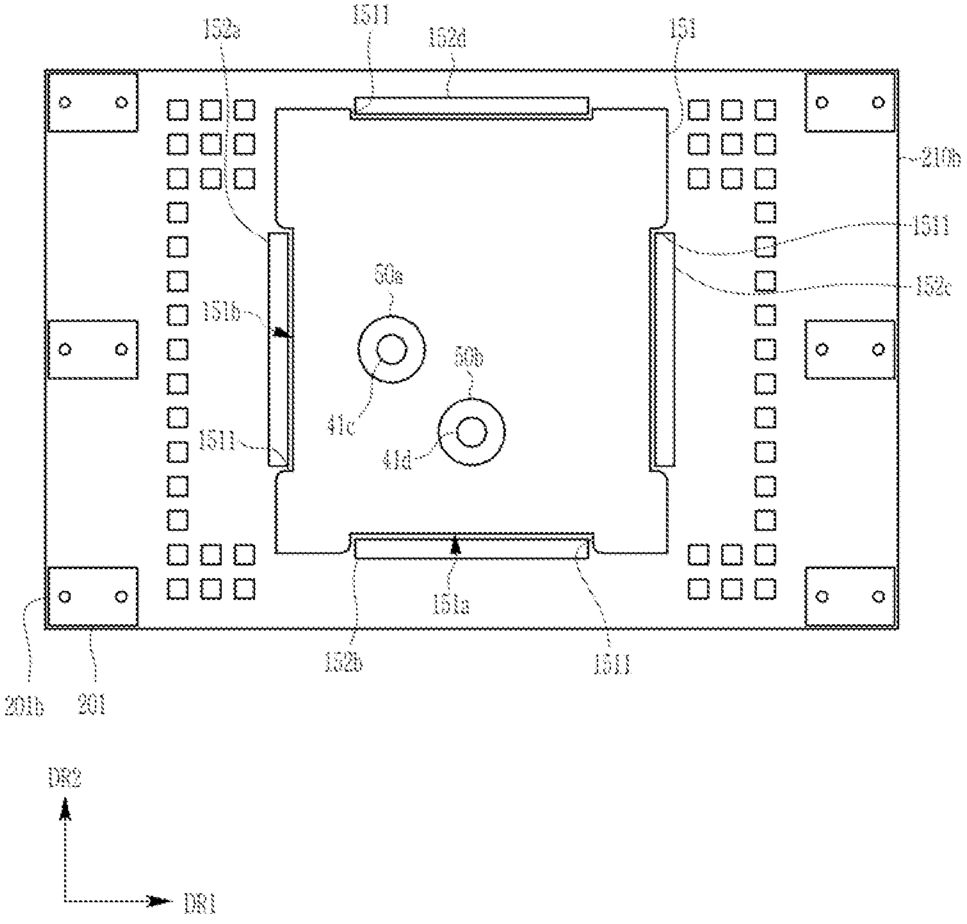

Referring to FIG. 7 in conjunction with FIG. 1 to FIG. 6, the first patch antenna pattern 151 and the plurality of first additional antenna patterns 152*a*, 152*b*, 152*c*, and 152*d* are disposed on the second layer 210*b* of the second dielectric layer 210.

The first patch antenna pattern 151 may be coupled to the first feed pattern 300*a* connected to the first feed via 121*a* to transmit and or receive a first RF signal with first polarization, and it may be coupled to the second feed pattern 300*b* connected to the second feed via 121*b* to transmit and/or receive a first RF signal with second polarization. In a non-limited example, the first polarization may be horizontal polarization, and the second polarization may be vertical polarization.

The first patch antenna pattern 151 may have a substantially quadrangular planar shape, and the first patch antenna pattern 151 includes a plurality of concave portions 1511 in a slit shape formed along four edges.

The first patch antenna pattern 151 may include a first edge 151*a* substantially parallel to the first direction (DR1) and a second edge 151*b* substantially parallel to the second direction (DR2). In a plan view, the first feed pattern 300*a* connected to the first feed via 121*a* may be disposed nearer the second edge 151*b* than the first edge 151*a*, and the second feed pattern 300*b* connected to the second feed via 121*b* may be disposed nearer the first edge 151*a* than the second edge 151*b*.

Each of the plurality of first additional antenna patterns 152*a*, 152*b*, 152*c*, and 152*d*, the patch antenna pattern 151 is disposed at the portion corresponding to each of the plurality of concave portions 1511 formed along the four edges, and at least a portion of each of the plurality of first additional antenna patterns 152*a*, 152*b*, 152*c*, and 152*d* may be disposed in each of the concave portions 1511 of the patch antenna pattern 151.

The concave portions 1511 of the first patch antenna pattern 151 may optimize an electrical length of the surface current flowing to the first patch antenna pattern 151.

The plurality of first additional antenna patterns 152*a*, 152*b*, 152*c*, and 152*d* may be spaced from the first patch antenna pattern 151, and may be coupled to the first patch antenna pattern 151. The plurality of first additional antenna patterns 152*a*, 152*b*, 152*c*, and 152*d* disposed on positions corresponding to the concave portions 1511 of the first patch antenna pattern 151 may provide additional impedance to the first patch antenna pattern 151, and hence, an additional resonance frequency may be provided and a bandwidth may be increased.

As described above, the plurality of inductive lines 133*a*, 133*b*, 133*c*, and 133*d* may be connected to the first patch antenna pattern 151 through the connecting via 32 and the connecting via 42 to provide a detour of the surface current flowing to the first patch antenna pattern 151, so inductance usable for impedance matching of a feeding path on the first patch antenna pattern 151 may be provided to the first patch antenna pattern 151.

At least a portion of each of the plurality of inductive lines 133*a*, 133*b*, 133*c*, and 133*d* may overlap each of the concave portions 1511 of the first patch antenna pattern 151 in the third direction (DR3), that is, the top-to-bottom direction.

The first connecting pattern 131*c* and the second connecting pattern 141*c* of the third feed pattern 300*c* may be connected to each other through the connecting via 31*c*, and the first connecting pattern 131*d* and the second connecting pattern 141*d* of the fourth feed pattern 300*d* may be connected to each other through the connecting via 31*d*.

The plurality of shielding vias 122*a*, 122*b*, 122*c*, 122*d*, 122*e*, 122*f*, 122*g*, 122*h*, and 122*i* may be connected to the first patch antenna pattern 151 through the plurality of first connectors 132*a*, 132*b*, 132*c*, 132*d*, 132*e*, 132*f*, 132*g*, 132*h*, and 132*i*, the plurality of second connectors 142*a*, 142*b*, 142*c*, 142*d*, 142*e*, 142*f*, 142*g*, 142*h*, and 142*i*, the plurality of first connecting vias 33, and the plurality of second connecting vias 43.

The plurality of shielding vias 122*a*, 122*b*, 122*c*, 122*d*, 122*e*, 122*f*, 122*g*, 122*h*, and 122*i* may shield the third feed pattern 300*c* and the fourth feed via 121*d* from the signals transmitted and/or received to or from the first patch antenna pattern 151 by connecting the ground plane 21 and the first patch antenna pattern 151.

The first patch antenna pattern 151 may have two holes 50*a* and 50*b* overlapping the second connecting pattern 141*c* of the third feed pattern 300*c* and the second connecting pattern 141*d* of the fourth feed pattern 300*d*, and the connecting via 41*c* connected to the second connecting pattern 141*c* of the third feed pattern 300*c* and the connecting via 41*d* connected to the second connecting pattern 141*d* of the fourth feed pattern 300*d* may penetrate the holes 50*a* and 50*b*.

Figure 8:
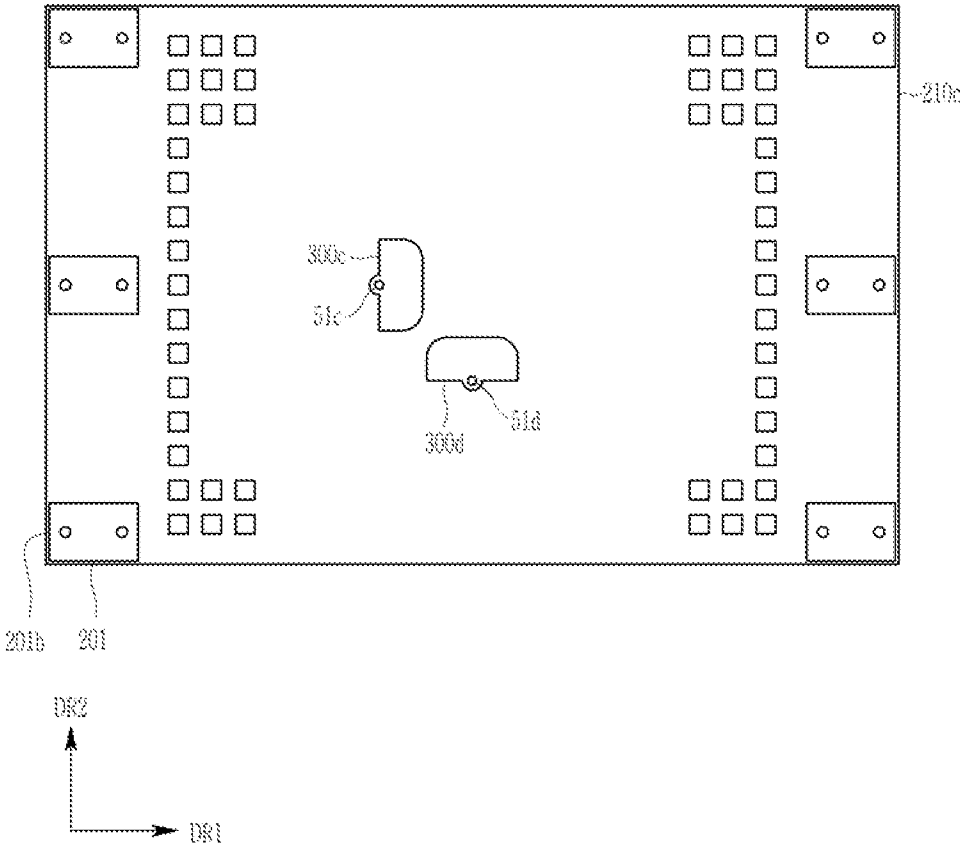

Referring to FIG. 8 in conjunction with FIG. 1 to FIG. 7, a third feed pattern 300*c* and a fourth feed pattern 300*d* may be disposed on the third layer 210*c* of the second dielectric layer 210.

The third feed pattern 300*c* may be connected to the third feed via 121*c* through the first connecting pattern 131*c*, the connecting via 31*c*, the second connecting pattern 141*c*, and the connecting via 41*c*, and the fourth feed pattern 300*d* may be connected to the fourth feed via 121*d* through the first connecting pattern 131*d*, the connecting via 31*d*, the second connecting pattern 141*d*, and the connecting via 41*d*.

Figure 9:
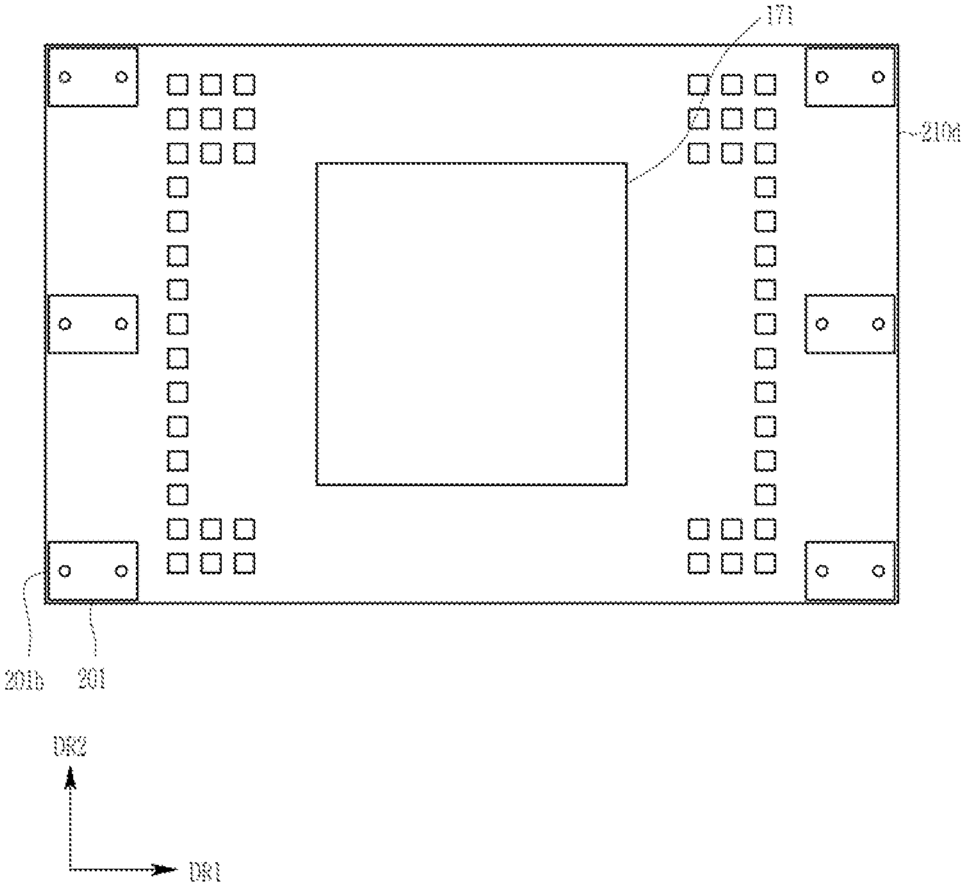

Referring to FIG. 9 in conjunction with FIG. 1 to FIG. 8, a second patch antenna pattern 171 may be disposed on the third layer 210*c* of the second dielectric layer 210.

The third feed pattern 300*c* and the fourth feed pattern 300*d* may be connected to the second patch antenna pattern 171 through the connecting vias 51*c* and 51*d*. The third feed pattern 300*c* and the fourth feed pattern 300*d* are coupled to the second patch antenna pattern 171 to transmit an electrical signal to the second patch antenna pattern 171.

Specifically, the third feed pattern 300*c* may be connected to the third feed via 121*c* through the first connecting pattern 131*c*, the connecting via 31*c*, the second connecting pattern 141*c*, and the connecting via 41*c*, and the third feed pattern 300*c* is connected to the second patch antenna pattern 171 through the connecting via 51*c*. The fourth feed pattern 300*d* is connected to the fourth feed via 121*d* through the first connecting pattern 131*d*, the connecting via 31*d*, the second connecting pattern 141*d*, and the connecting via 41*d*, and the fourth feed pattern 300*d* is connected to the second patch antenna pattern 171 through the connecting via 51*d*.

The second patch antenna pattern 171 may be coupled to the third feed pattern 300*c* connected to the third feed via 121*c* to transmit and/or receive the second RF signal with first polarization, and may be coupled to the fourth feed pattern 300*d* connected to the fourth feed via 121*d* to transmit and receive the second RF signal with second polarization. The first polarization may be horizontal polarization, and the second polarization may be vertical polarization.

As described above, the first patch antenna pattern 151 may be coupled to the first feed pattern 300*a* connected to the first feed via 121*a* to transmit and receive a first RF signal with first polarization, and it may be coupled to the second feed pattern 300*b* connected to the second feed via 121*b* to transmit and/or receive a first RF signal with second polarization. The first polarization may be horizontal polarization, and the second polarization may be vertical polarization.

The first RF signal is a signal in a first frequency bandwidth, the second RF signal is a signal in a second frequency bandwidth, and in a non-limited example, the first frequency bandwidth may be about 24.25 GHz to about 29.5 GHz, and a center frequency of the first frequency bandwidth may be about 28 GHz. The second frequency bandwidth may be about 37 GHz to about 40 GHz, and a center frequency of the second frequency bandwidth may be about 39 GHz.

Figure 10:
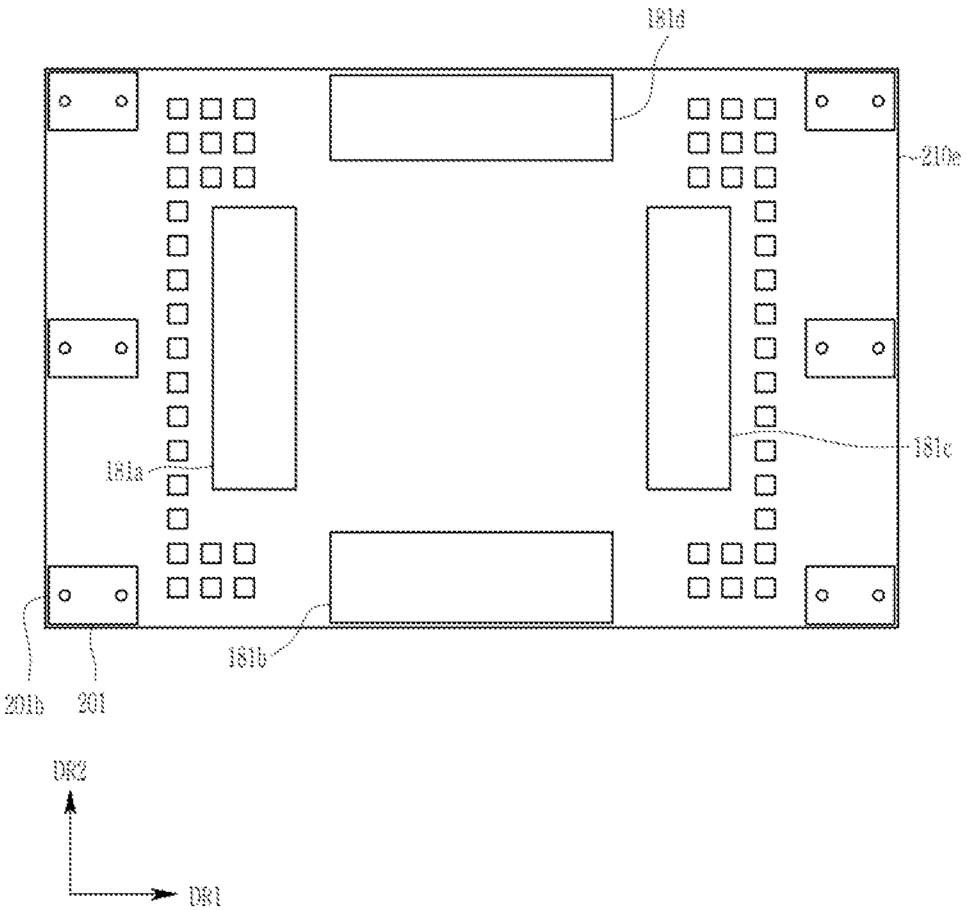

Referring to FIG. 10 in conjunction with FIG. 1 to FIG. 9, the plurality of second additional antenna patterns 181*a*, 181*b*, 181*c*, and 181*d* may be disposed on the fifth layer 210*e* of the second dielectric layer 210.

Figure 11:
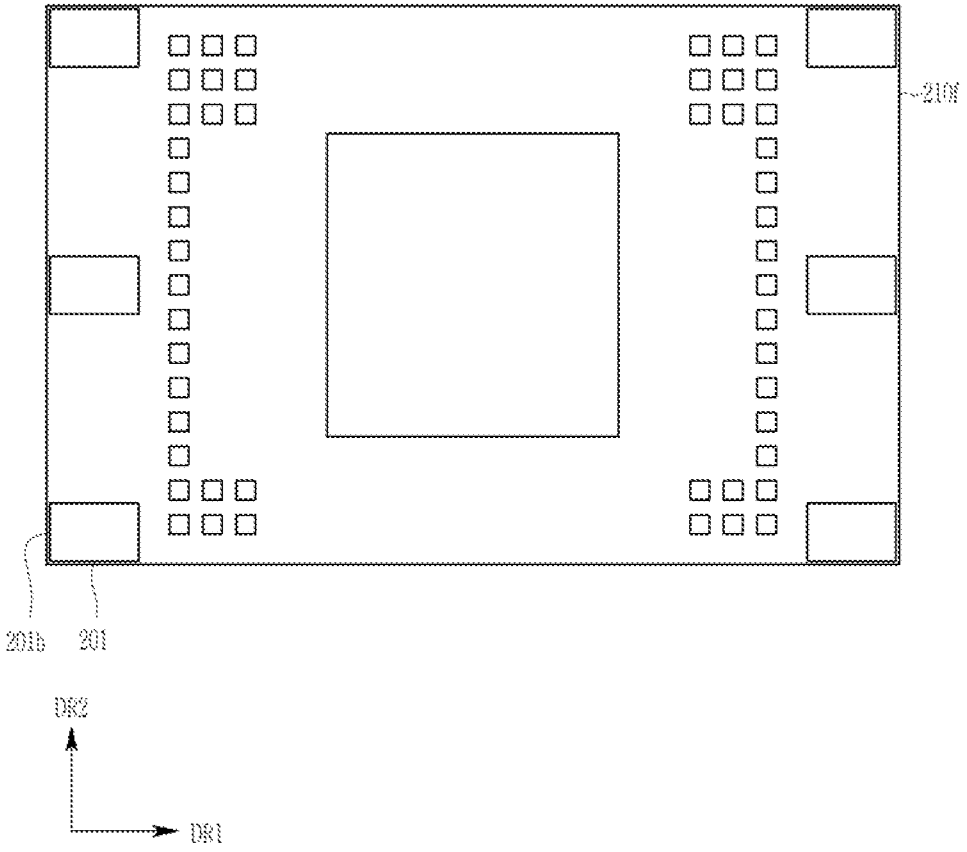

Referring to FIG. 11 in conjunction with FIG. 1 to FIG. 10, the third patch antenna pattern 191 may be disposed on the sixth layer 210*f* of the second dielectric layer 210.

The second patch antenna pattern 171 may be a driven patch that transmits and/or receives the second RF signal, the plurality of second additional antenna patterns 181*a*, 181*b*, 181*c*, and 181*d* may be parasitic patches that transmits and/or receives a signal in a second frequency bandwidth, and the third patch antenna pattern 191 may be a director that transmits and/or receives the signal in a second frequency bandwidth. However, they are not limited thereto.

The plurality of second additional antenna patterns 181*a*, 181*b*, 181*c*, and 181*d* and the third patch antenna pattern 191 are included in addition to the second patch antenna pattern 171, thereby increasing the bandwidth and the gain of the second RF signal without increasing the size of the second patch antenna pattern 171.

A characteristic of an antenna device 1000, in accordance with one or more embodiments, will now be described with reference to FIG. 12 and FIG. 13, in conjunction with FIG. 1 to FIG. 11.

Figure 12:
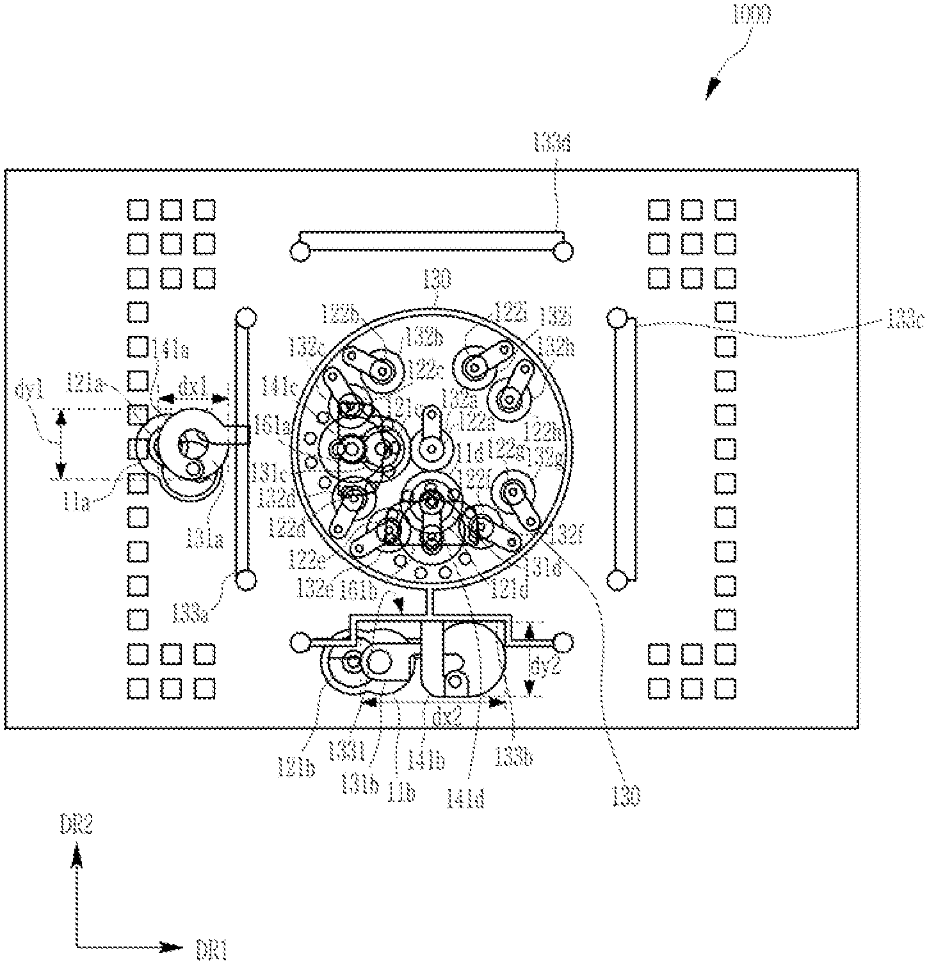
FIG. 12 illustrates a top plan view of part of an example antenna device, in accordance with one or more embodiments.
Figure 13:
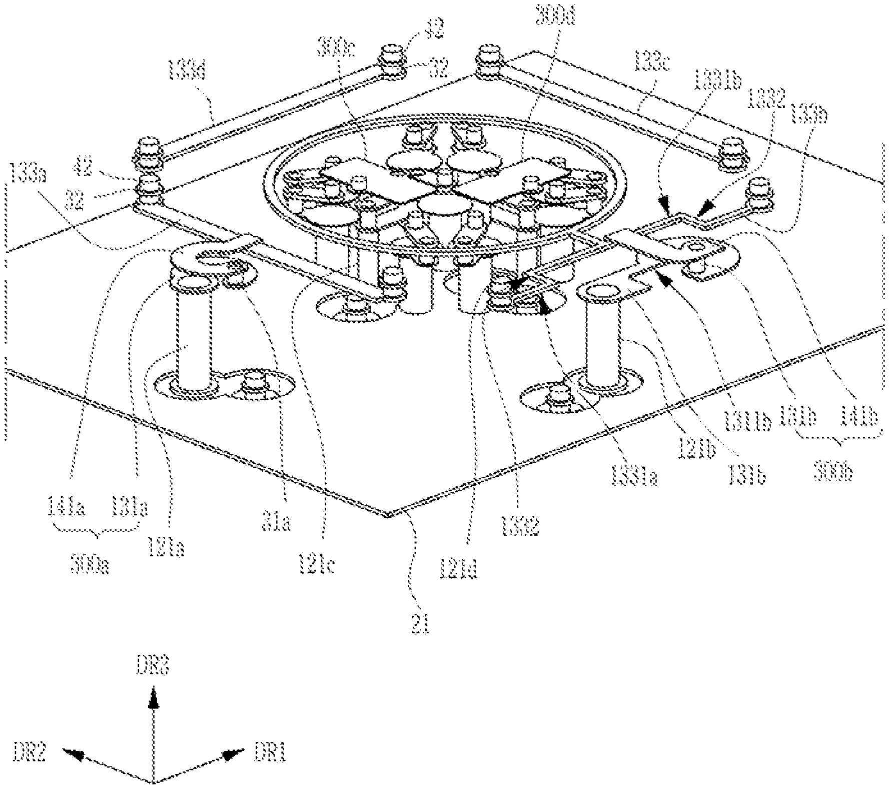
FIG. 13 illustrates a perspective view of part of an example antenna device, in accordance with one or more embodiments.

FIG. 12 illustrates a top plan view of part of an example antenna device, in accordance with one or more embodiments, and FIG. 13 illustrates a perspective view of part of an example antenna device, in accordance with one or more embodiments.

In an example, the antenna device 1000 may be installed in the electronic device, a size of a bezel of the electronic device may be reduced, and the antenna device 1000 may be installed, not in the front of the electronic device, but on the lateral side of the bezel. As the electronic device is implemented in a thin form factor, the lateral side of the bezel in which the antenna device 1000 is installed becomes thin, and the width of the antenna device 1000 in the second direction (DR2) may be reduced.

As the width of the antenna device 1000 in the second direction (DR2) is reduced, a path of the surface current flowing in the second direction (DR2) may be reduced. Therefore, a bandwidth of the second polarization RF signal for transmitting and receiving the RF signal may be reduced by the surface current flowing in the second direction (DR2).

As the width of the antenna device 1000 in the second direction (DR2) is reduced, the gap between the second feed via 121*b* and the fourth feed via 121*d* that are adjacently disposed in the second direction (DR2) may be relatively reduced, and accordingly, isolation between the signal transmitted by the second feed via 121*b* and the signal transmitted by the fourth feed via 121*d* may be lowered.

As described above, according to the example antenna device, in accordance with one or more embodiments, the first pattern 131*a* of the first feed pattern 300*a* may be twisted in one direction, and the first pattern 131*b* of the second feed pattern 300*b* may include a linear portion 1311 extending in the first direction (DR1) and a rotation portion 1312 connected to the linear portion 1311 and twisted in one direction. Therefore, a second width dx2 of the second feed pattern 300*b* measured in a direction that is parallel to the first direction (DR1) may be greater than a first width dy1 of the first feed pattern 300*a* measured in a direction that is parallel to the second direction (DR2). A second width dx2 of the second feed pattern 300*b* measured in a direction that is parallel to the first direction (DR1) may be greater than a third width dx1 of the first feed pattern 300*a* measured in a direction that is parallel to the first direction (DR1). A third width dx1 of the first feed pattern 300*a* measured in a direction that is parallel to the first direction (DR1) may be substantially equal to a fourth width dy2 of the second feed pattern 300*b* measured in a direction that is parallel to the second direction (DR2). A height of the first feed pattern 300*a* and a height of the second feed pattern 300*b* measured from the ground plane 21 in the third direction (DR3) that is perpendicular to the first direction (DR1) and the second direction (DR2) may be substantially the same.

In a plan view, the first feed pattern 300*a* may be disposed near the second edge 151*b* in parallel to the second direction (DR2) from among the edges of the first patch antenna pattern 151, the second feed pattern 300*b* may be disposed near the first edge 151*a* in parallel to the first direction (DR1) from among the edges of the first patch antenna pattern 151, and a second width dx2 of the second feed pattern 300*b* measured in a direction that is parallel to the first direction (DR1) may be greater than a first width dy1 of the first feed pattern 300*a* measured in a direction that is parallel to the second direction (DR2).

As described, the second width dx2 of the second feed pattern 300*b* may be greater than the first width dy1 of the first feed pattern 300*a* measured in the direction parallel to the adjacent edge from among the edges of the first patch antenna pattern 151, and accordingly, when the width of the antenna device 1000 in the second direction (DR2) is reduced, reduction of the bandwidth of the first RF signal with second polarization transmitted to the first patch antenna pattern 151 through the second feed pattern 300*b* may be prevented.

Further, according to the example antenna device, in accordance with one or more embodiments, from among the plurality of inductive lines 133*a*, 133*b*, 133*c*, and 133*d* connected to the first patch antenna pattern 151 and providing a detour of the surface current flowing to the first patch antenna pattern 151, the length of the second inductive line 133*b* is greater than the each length of the first inductive line 133*a*, the third inductive line 133*c*, and the fourth inductive line 133*d*, so the detour of the surface current caused by the second inductive line 133*b* disposed near the second feed via 121*b* may become relatively long, so when the width of the antenna device 1000 in the second direction (DR2) is reduced, reduction of the bandwidth of the first RF signal with second polarization transmitted to the first patch antenna pattern 151 through the second feed pattern 300*b* may be prevented.

According to the example antenna device, in accordance with one or more embodiments, the second inductive line 133*b* disposed near the second feed pattern 300*b* includes protrusions 1332 and 1331*b*, so when the width of the antenna device 1000 in the second direction (DR2) is reduced, a space for disposing the second feed pattern 300*b* connected to the second feed via 121*b* may be provided, and the second feed pattern 300*b* is disposed to be spaced from the second inductive line 133*b*, thereby reducing interference of the second inductive line 133*b* on the signal fed by the second feed pattern 300*b*.

According to the example antenna device, in accordance with one or more embodiments, the decoupled pattern 130 connected to the second inductive line 133*b* and disposed between the first feed via 121*a* and the third feed via 121*c* and between the second feed via 121*b* and the fourth feed via 121*d* is included, thereby preventing coupling between the first feed via 121*a* and the third feed via 121*c* disposed near each other, and preventing coupling between the second feed via 121*b* and the fourth feed via 121*d* disposed near each other. Hence, isolation between the first feed via 121*a* and the third feed via 121*c* of which the gap is reduced as the size of the antenna device 1000 is reduced may be increased. Particularly, as the width of the antenna device 1000 in the second direction (DR2) is reduced, isolation between the second feed via 121*b* and the fourth feed via 121*d* of which the gap therebetween is further reduced may be increased. The decoupled pattern 130 may additionally provide a detour of the surface current caused by the second inductive line 133*b*.

Figure 14:
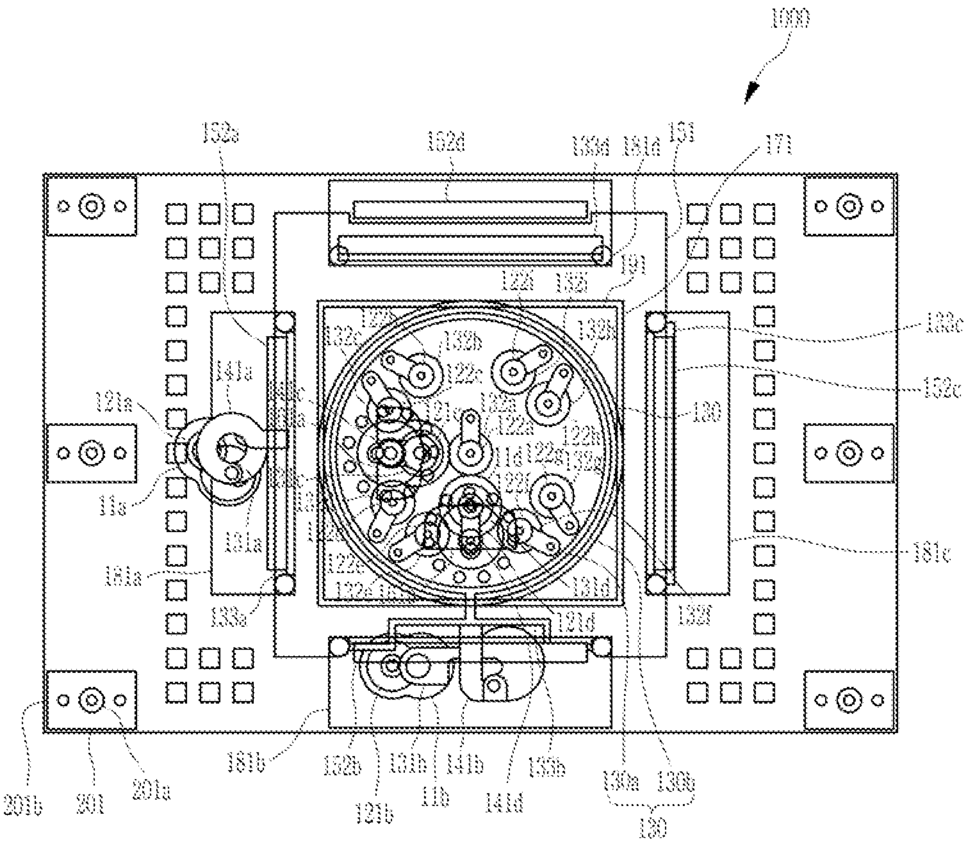
FIG. 14 illustrates a top plan view of an example antenna device, in accordance with one or more embodiments.

An example antenna device, in accordance with one or more embodiments, will now be described with reference to FIG. 14. FIG. 14 illustrates a top plan view of an example antenna device, in accordance with one or more embodiments.

Referring to FIG. 14, the example antenna device according to the present embodiment, in accordance with one or more embodiments, is similar to the example antenna device according to an embodiment described with reference to FIG. 1 to FIG. 13. No detail of same constituent elements will be provided.

However, the example antenna device according to the present embodiment may have a double-layered decoupled pattern 130, differing from the above-described antenna device according to an embodiment.

As described above, the decoupled pattern 130 may be connected to the second inductive line 133*b*, and the decoupled pattern 130 may be disposed between the first feed via 121*a* and the third feed via 121*c* and between the second feed via 121*b* and the fourth feed via 121*d*.

The decoupled pattern 130 may prevent coupling between the first feed via 121*a* and the third feed via 121*c* disposed near each other, and may prevent coupling between the second feed via 121*b* and the fourth feed via 121*d* disposed near each other, to thus reduce the size of the antenna device 1000 and increase isolation between the first feed via 121*a* and the third feed via 121*c* of which the gap is reduced, and the width of the antenna device 1000 in the second direction (DR2) is reduced, thereby increasing isolation between the second feed via 121*b* and the fourth feed via 121*d* of which the gap therebetween is further reduced.

As the decoupled pattern 130 has a double structure, the isolation between the first feed via 121*a* and the third feed via 121*c* and the isolation between the second feed via 121*b* and the fourth feed via 121*d* may be further increased, and the detour of the surface current caused by the second inductive line 133*b* may become longer.

Many characteristics of the example antenna device, in accordance with one or more embodiments, described with reference to FIG. 1 to FIG. 13 are applicable to the example antenna device according to the present embodiment.

Figure 15:
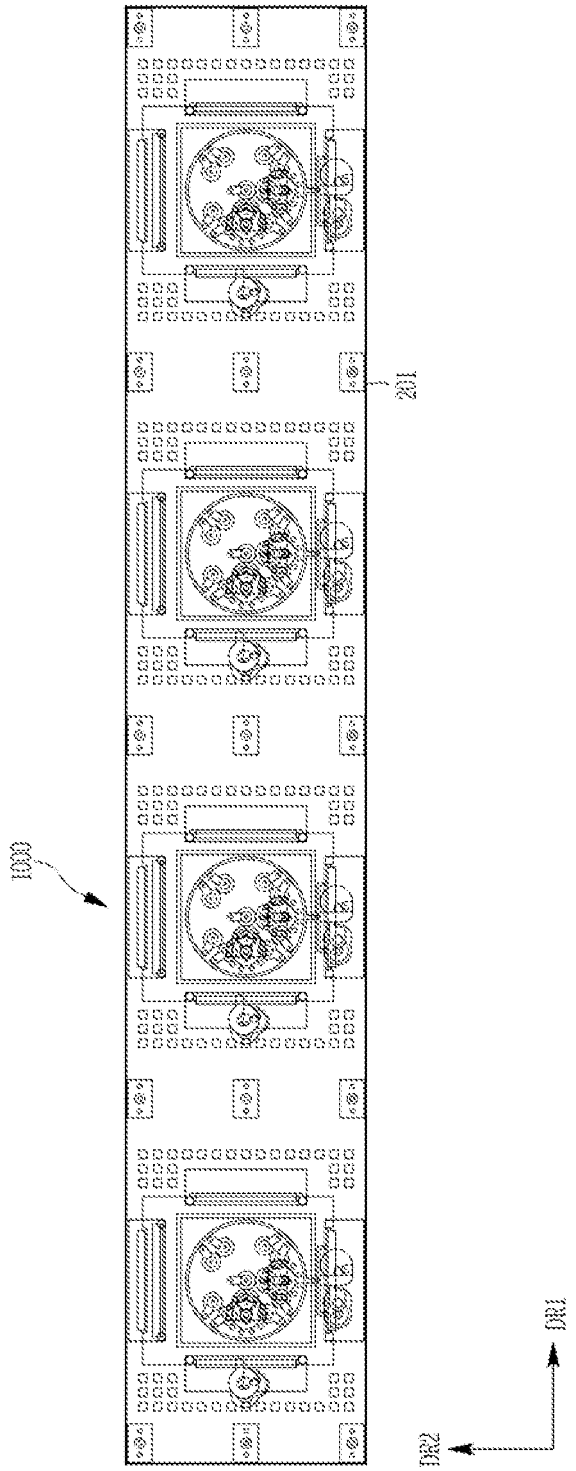
FIG. 15 illustrates a top plan view of an arrangement of a plurality of example antenna devices, in accordance with one or more embodiments.

An example antenna array, in accordance with one or more embodiments, will now be described with reference to FIG. 15. FIG. 15 illustrates a top plan view of an arrangement of a plurality of example antenna devices, in accordance with one or more embodiments.

An antenna array includes a plurality of antenna devices 1000. The respective antenna devices 1000 may be one of the antenna devices described with reference to FIG. 1 to FIG. 14. A detailed description of the antenna devices will be omitted.

A plurality of shielding structures 201 are disposed among a plurality of antenna devices 1000 so as to block interference between the plurality of antenna devices 1000. The shielding structures 201 may prevent interference among the plurality of antenna devices 1000, and a gain of the antenna array may be accordingly increased.

According to the antenna device according to the present embodiment, the first patch antenna pattern 151, the second patch antenna pattern 171, and the third patch antenna pattern 191 have a quadrangular planar shape with an edge that is substantially parallel to the edge of the antenna device, so differing from the example in which the first patch antenna pattern 151, the second patch antenna pattern 171, and the third patch antenna pattern 191 are slanted with a predetermined angle with respect to one side of the antenna device, the first polarization RF signal may be propagated in the first direction (DR1) and the second polarization RF signal may be propagated in the second direction (DR2).

Therefore, when the plurality of antenna devices 1000 are arranged in an array form in the first direction (DR1), the second polarization RF signal propagated in the second direction (DR2) may have less interference in the array, and by this, the width of the antenna device 1000 in the second direction (DR2) may be reduced, and deterioration of the bandwidth caused by the interference between adjacent antennas of the second polarization RF signal of which the bandwidth may be reduced may be prevented.

Figure 16:
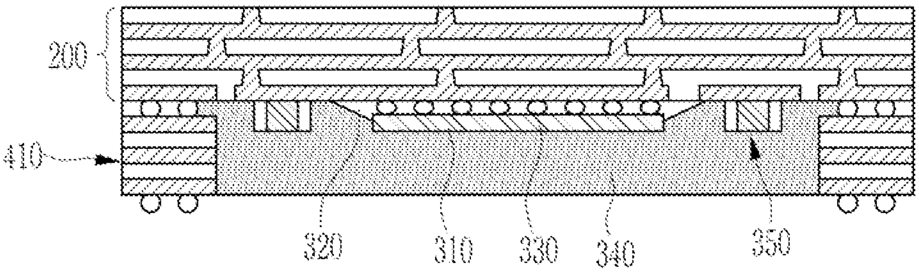
FIG. 16 illustrates a side view of a structure of a lower side of an example antenna device, in accordance with one or more embodiments.

A configuration of a lower side of an antenna device, in accordance with one or more embodiments, will now be described with reference to FIG. 16. FIG. 16 illustrates a side view of a structure of a lower side of an example antenna device, in accordance with one or more embodiments.

Referring to FIG. 16, the antenna device may include at least some of a connecting member 200, an integrated circuit (IC) 310, an adhesion member 320, an electrical connection structure 330, a sealing material 340, a passive element 350, and a core member 410.

The connecting member 200 may have a structure in which a plurality of metal layers with a predetermined pattern, and a plurality of insulation layers are alternately stacked in a similar manner of a printed circuit board (PCB).

The IC 310 may be disposed on a lower side of the connecting member 200. The IC 310 may be connected to a wire of the connecting member 200 to transmit or receive the RF signal, and may be connected to the ground plane of the connecting member 200 to receive the ground. In an example, the IC 310 may generate a signal that is converted by performing at least some of frequency conversion, amplification, filtering, phase-control, and generation of power.

The adhesion member 320 may adhere the IC 310 and the connecting member 200.

The electrical connection structure 330 may connect the IC 310 and the connecting member 200. In an example, the electrical connection structure 330 may have a structure such as, but not limited to, a solder ball, a pin, a land, or a pad. The electrical connection structure 330 may have a melting point that is lower than melting points of the wire of the connecting member 200 and the ground plane, and it may connect the IC 310 and the connecting member 200 according to a predetermined process based on the low melting point.

The sealing material 340 may seal at least part of the IC 310, and may improve heat sink performance and impact protection performance of the IC 310. In a non-limited example, the sealing material 340 may be realized with a photoimageable encapsulant (PIE), an Ajinomoto build-up film (ABF), or an epoxy molding compound (EMC).

The passive element 350 may be disposed on a lower side of the connecting member 200, and it may be connected to a wire and/or a ground plane of the connecting member 200 through the electrical connection structure 330. In a non-limited example, the passive element 350 may include at least one of a capacitor (e.g., a multi-layer ceramic capacitor (MLCC)), an inductor, and a chip resistor.

The core member 410 may be disposed on a lower side of the connecting member 200, and it may be connected to the connecting member 200 so as to receive an intermediate frequency (IF) signal or a baseband signal from an external source and may transmit the received IF signal or baseband signal to the IC 310, or receive the IF signal or the baseband signal from the IC 310 and transmit the same to an external source. Here, the frequency of the RF signal (e.g., 24 GHz, 28 GHz, 36 GHz, 39 GHz, or 60 GHz) is greater than the frequency of the IF signal (e.g., 2 GHz, 5 GHz, or 10 GHz).

In an example, the core member 410 may transmit the IF signal or the baseband signal to the IC 310, or may receive the IF signal or the baseband signal from the IC 310 through a wire included in an IC ground plane of the connecting member 200. The ground plane of the connecting member 200 may be disposed between the IC ground plane and the wire, so the IF signal or the baseband signal and the RF signal may be electrically isolated in the antenna device.

Figure 17:
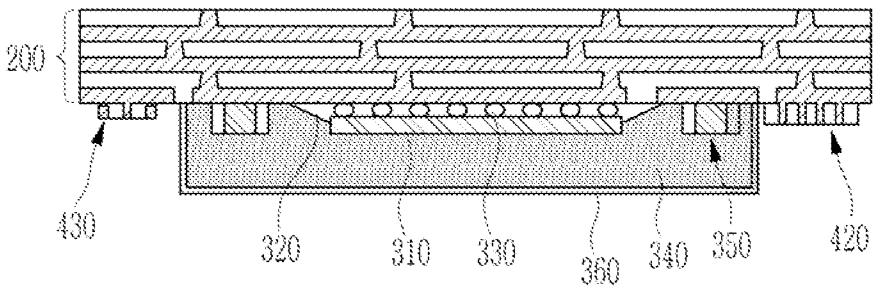
FIG. 17 illustrates a side view of a structure of a lower side of an example antenna device, in accordance with one or more embodiments.

A structure of a lower side of an example antenna device, in accordance with one or more embodiments, will now be described with reference to FIG. 17. FIG. 17 illustrates a side view of a structure of a lower side of an example antenna device, in accordance with one or more embodiments.

Referring to FIG. 17, the example antenna device, in accordance with one or more embodiments, may include at least one of a shield member 360, a connector 420, and a chip antenna 430.

The shield member 360 may be disposed on the lower side of the connecting member 200, and may be disposed to confine the IC 310 and the sealing material 340 together with the connecting member 200. In an example, the shield member 360 may be disposed to entirely cover the IC 310, the passive element 350, and the sealing material 340 (e.g., conformal shield), or individually cover them (e.g., compartment shield). In an example, the shield member 360 may have a hexahedron shape of which one side is opened, and may have a receiving space in a hexahedron shape through a combination with the connecting member 200. The shield member 360 may be realized with a material with high conductivity such as copper and may have a short skin depth, and it may be connected to the ground plane of the connecting member 200. Therefore, the shield member 360 may reduce electromagnetic noise that may be received by the IC 310 and the passive element 350. However, the sealing material 340 may be omitted based on particular implementations.

The connector 420 may have an access structure of a cable (e.g., a coaxial cable or a flexible PCB), may be connected to the IC ground plane of the connecting member 200, and may perform a similar function to the sub-substrate. The connector 420 may receive, as only examples, an IF signal, a baseband signal, and/or power from the cable, or may provide the IF signal and/or the baseband signal to the cable.

The chip antenna 430 may transmit or receive the RF signal in support of the antenna device, in accordance with one or more embodiments. In an example, the chip antenna 430 may include a dielectric material block with a greater dielectric constant than the insulation layer, and a plurality of electrodes disposed on respective sides of the dielectric material block. One of the plurality of electrodes may be connected to the wire of the connecting member 200, and the other thereof may be connected to the ground plane of the connecting member 200.

Figure 18:
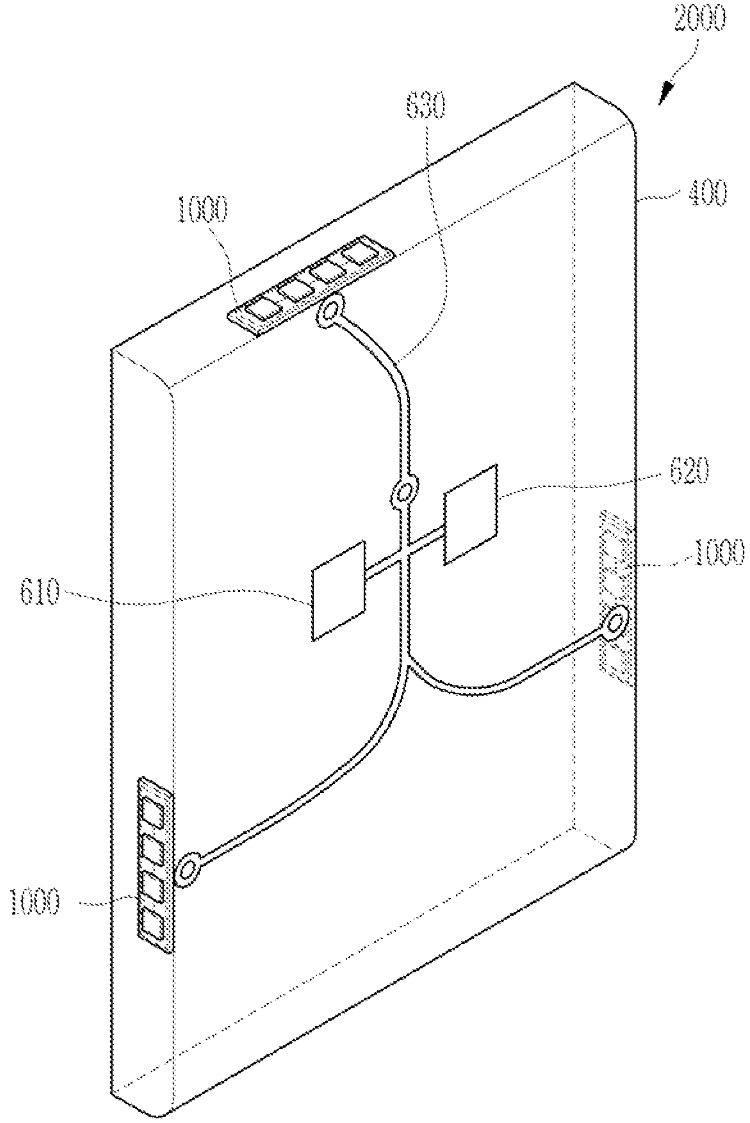
FIG. 18 illustrates a schematic diagram of an example electronic device including an example antenna device, in accordance with one or more embodiments.

An electronic device including an example antenna device, in accordance with one or more embodiments, will now be described with reference to FIG. 18. FIG. 18 illustrates a schematic diagram of an electronic device including an antenna device according to an embodiment.

Referring to FIG. 18, the electronic device 2000 may include an antenna device 1000, and the antenna device 1000 may be disposed on a set or a body 400 of the electronic device 2000.

The electronic device 2000 may include, as non-limited examples, a smart phone, a personal digital assistant, a digital video camera, a digital still camera, a network system, a computer, a monitor, a tablet, a laptop, a netbook, a television, a video game, a smart watch, and an automotive part, but is not limited thereto.

The electronic device 2000 may have a polygonal side, and the antenna device 1000 may be disposed near at least one of a plurality of sides of the electronic device 2000.

A communication module or modem 610 and a baseband circuit 620 may be further disposed on the set or body 400. The antenna device 1000 may be connected to the communication module or modem 610 and/or the baseband circuit 620 through the coaxial cable 630.

The communication module or modem 610 may include at least some of a memory chip including a volatile memory (e.g., a DRAM), a non-volatile memory (e.g., a ROM), and a flash memory; an application processor chip including a central processor (e.g., a CPU), a graphics signal processor (e.g., a GPU), a digital signal processor, an encryption processor, a microprocessor, and a microcontroller; and a logic chip including an analog-digital converter and an application-specific IC (ASIC) so as to perform digital signal processing.

The baseband circuit 620 may generate a base signal by performing analog-digital conversion, and amplification, filtering, and frequency conversion on the analog signal. The base signal input and output by the baseband circuit 620 may be transmitted to the antenna device through a cable.

In an example, the base signal may be transmitted to the IC through an electrical connection structure, a core via, and a wire. The IC may convert the base signal into a mmWave-band RF signal.

Figure 19:
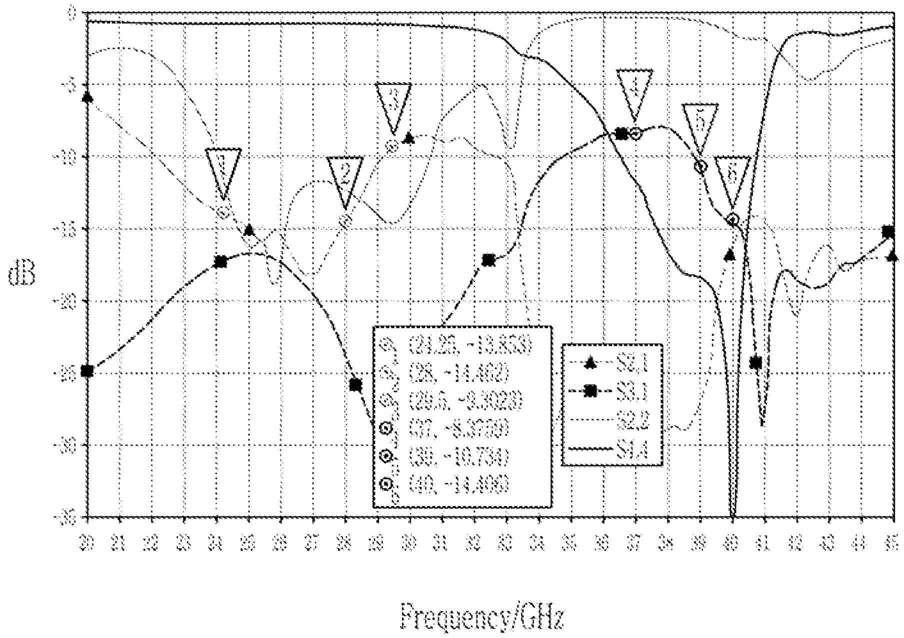
FIG. 19 and FIG. 20 illustrate graphs of results of an experimental example, in accordance with one or more embodiments.
Figure 20:
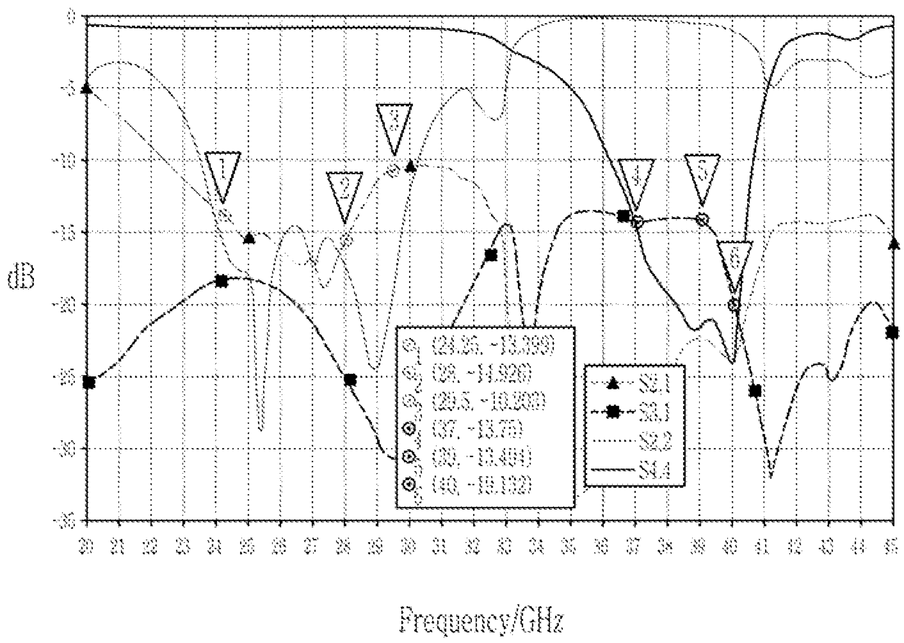

An experimental example will now be described with reference to FIG. 19 and FIG. 20. FIG. 19 and FIG. 20 illustrate graphs of results of an experimental example.

In the present experimental example, S-parameters with respect to frequency bandwidth are measured for a first example in which the plurality of inductive lines 133*a*, 133*b*, 133*c*, and 133*d* and the decoupled pattern 130 included in the example antenna device according to an embodiment are removed, and a second example in which the plurality of inductive lines 133*a*, 133*b*, 133*c*, and 133*d* and a decoupled pattern 130 are formed in a like manner of the antenna device according to an embodiment, and measured results are expressed in FIG. 19 and FIG. 20. FIG. 19 illustrates a result of the first example, and FIG. 20 illustrates a result of the second example.

Referring to FIG. 19 and FIG. 20, according to the second example in which the plurality of inductive lines 133*a*, 133*b* 133*c*, and 133*d* and the decoupled pattern 130 are formed in a like manner of the antenna device according to an embodiment, it is found, compared to the first example, that the bandwidth of the RF signal is increased, and isolation of the low frequency RF signal and the high frequency RF signal is increased. In an example, when the portions marked with numbers 4 and 5 are compared, it is found that an absolute value of a return loss is increased from about 8.4 dB to about 13.8 dB, that is, by about 5.4 dB, and the isolation is accordingly increased.

Another experimental example will now be described with reference to Table 1 and Table 2. In the present experimental example, an example antenna device, in accordance with one or more embodiments, is formed, gain characteristics of vertical polarization and horizontal polarization signals are measured for the respective frequencies, and corresponding results are expressed in Table 1 and Table 2. Table 1 expresses results of low frequency bandwidths, and Table 2 expresses results of high frequency bandwidths.

TABLE 1

| Frequency | 24.25 | 25 | 26 | 27 | 28 | 29 | 29.5 | Average |
|---|---|---|---|---|---|---|---|---|
| V-pol | 7.98 | 9.2 | 10.1 | 10.6 | 10.4 | 10.1 | 10 | 9.75 |
| H-pol | 9.3 | 9.67 | 9387 | 9.89 | 9.9 | 9.65 | 9.42 | 9.67 |

TABLE 2

| Frequency | 37 | 38 | 39 | 40 | average |
|---|---|---|---|---|---|
| V-pol | 10.3 | 10.7 | 10.4 | 10.6 | 10.50 |
| H-pol | 11.7 | 11.8 | 11.5 | 11.3 | 11.58 |

Referring to Table 1, it is found that the gain of the low frequency bandwidth with vertical polarization is not smaller than the gain with horizontal polarization, and has the result that is substantially close to 10. Referring to Table 2, it is also found that the gains of the horizontal polarization and the vertical polarization in the high frequency bandwidth have a value of equal to or greater than 10.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna device, comprising:

a ground plane;

a dielectric layer, disposed on the ground plane;

a first patch antenna pattern, disposed on the dielectric layer;

a first feed via and a second feed via configured to feed a first radio frequency (RF) signal to the first patch antenna pattern;

a first feed pattern, connected to the first feed via, and coupled to the first patch antenna pattern; and a second feed pattern, connected to the second feed via, and coupled to the first patch antenna pattern, wherein the first patch antenna pattern includes a first edge in parallel with a first direction and a second edge in parallel with a second direction that is different from the first direction, the first feed pattern is disposed closer to the second edge of the first patch antenna than to the first edge of the first patch antenna in a plan view, the second feed pattern is disposed closer to the first edge of the first patch antenna than the second edge of the first patch antenna in a plan view, and a first width of the first feed pattern measured in the second direction is different from a second width of the second feed pattern measured in the first direction.

2. The antenna device of claim 1, wherein:

a height of the first feed pattern is substantially equal to a height of the second feed pattern measured from the ground plane in a third direction that is perpendicular to the first direction and the second direction, and the first width of the first feed pattern is greater than the second width of the second feed pattern.

3. The antenna device of claim 2, further comprising:

a first inductive line connected to the first patch antenna pattern and coupled to the first feed pattern; and a second inductive line connected to the first patch antenna pattern and coupled to the second feed pattern, wherein the second inductive line has a length that is greater than a length of the first inductive line.

4. The antenna device of claim 3, wherein:

the first inductive line is configured to have a straight-line form, and the second inductive line includes a protrusion configured to protrude toward a center of the first patch antenna pattern.

5. The antenna device of claim 3, further comprising:

a second patch antenna pattern disposed on the dielectric layer;

a third feed via and a fourth feed via configured to feed a second RF signal to the second patch antenna pattern; and a decoupled pattern disposed between the first feed via and the third feed via, and between the second feed via and the fourth feed via in a plan view, wherein a frequency of the first RF signal is different from a frequency of the second RF signal.

6. The antenna device of claim 5, wherein:

the decoupled pattern is connected to the second inductive line.

7. The antenna device of claim 3, wherein:

the first patch antenna pattern comprises a plurality of concave portions formed on at least one edge of the first patch antenna pattern, and at least a portion of the first inductive line and the second inductive line overlap the concave portions in a top-to-bottom direction.

8. The antenna device of claim 7, further comprising:

a plurality of second antenna patterns spaced from the first patch antenna pattern and, disposed at areas corresponding to the concave portions, wherein at least portions of the plurality of second antenna patterns are disposed in the concave portions.

9. An antenna device, comprising:

a ground plane;

a dielectric layer, disposed on the ground plane;

a first patch antenna pattern and a second patch antenna pattern disposed on the dielectric layer;

a first feed via configured to feed a first radio frequency (RF) signal to the first patch antenna pattern;

a second feed via configured to feed a second RF signal to the second patch antenna pattern;

an inductive line connected to the first patch antenna pattern and coupled to the first feed via; and a decoupled pattern connected to the inductive line and disposed between the first feed via and the second feed via in a plan view.

10. The antenna device of claim 9, wherein:

the decoupled pattern overlaps the first patch antenna pattern and the second patch antenna pattern in a top-to-bottom direction.

11. The antenna device of claim 9, wherein:

the first patch antenna pattern includes a concave portion formed in at least one edge of the first patch antenna pattern, and at least a portion of the inductive line overlaps the concave portion in a top-to-bottom direction.

12. The antenna device of claim 11, further comprising:

a second antenna pattern spaced from the first patch antenna pattern, and disposed on an area corresponding to the concave portion, and wherein at least a portion of the second antenna pattern is disposed in the concave portion.

13. The antenna device of claim 9, wherein:

the decoupled pattern surrounds the second feed via.

* * * * *